United States Patent
Miyagawa

(10) Patent No.: US 7,458,261 B2
(45) Date of Patent: Dec. 2, 2008

(54) LIQUID LEVEL DETECTOR

(75) Inventor: Isao Miyagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/979,750

(22) Filed: Nov. 8, 2007

(65) Prior Publication Data
US 2008/0072668 A1    Mar. 27, 2008

Related U.S. Application Data

(62) Division of application No. 11/004,937, filed on Dec. 7, 2004, now Pat. No. 7,377,163.

(30) Foreign Application Priority Data

Mar. 16, 2004   (JP)   ............................... 2004-74891

(51) Int. Cl.
*G01F 23/32*   (2006.01)
*G01F 23/38*   (2006.01)

(52) U.S. Cl. ..................... 73/317; 073/290 R; 073/305; 073/312; 073/314

(58) Field of Classification Search ............. 073/290 R, 073/305–322
See application file for complete search history.

(56) References Cited

U.S. PATENT DOCUMENTS

| | | | |
|---|---|---|---|
| 5,535,512 A | | 7/1996 | Armogan |
| 5,765,435 A | * | 6/1998 | Grotschel et al. ............. 73/313 |
| 6,401,533 B1 | * | 6/2002 | Gier et al. ..................... 73/313 |
| 6,658,934 B1 | * | 12/2003 | Housey et al. ................ 73/317 |
| 2003/0168336 A1 | | 9/2003 | Downer et al. |
| 2004/0003660 A1 | | 1/2004 | Fukuhara et al. |
| 2004/0016296 A1 | * | 1/2004 | Weisse ........................ 73/314 |
| 2004/0182150 A1 | * | 9/2004 | Okada et al. .................. 73/313 |
| 2004/0221646 A1 | * | 11/2004 | Ohhashi et al. ............... 73/313 |
| 2005/0103103 A1 | * | 5/2005 | Newman et al. .............. 73/313 |

FOREIGN PATENT DOCUMENTS

JP   64-011718 U   1/1989

(Continued)

OTHER PUBLICATIONS

Notice of Reasons for Rejection and its English translation from Japanese Patent Office for corresponding Japanese patent application No. 2003-175298 dates Nov. 20, 2007.

*Primary Examiner*—David A. Rogers
(74) *Attorney, Agent, or Firm*—Posz Law Group, PLC

(57) ABSTRACT

Two pairs of regulating means, that is, the first stopper and the second stopper, which regulate a rotary angle range of the magnet holder when the first stopper and the second stopper come into contact with the stopper of the arm integrally fixed to the magnet holder, are provided in the body which is a fixing member, and the rotary angle range of the magnet holder regulated by one pair of stoppers is made to be different from the rotary angle range of the magnet holder regulated by the other pair of stoppers. Due to the foregoing, when the expensive body is made to be a common part and a plurality of types of inexpensive arms are manufactured, the fuel level gauge can be provided, an increase in the manufacturing cost of which is suppressed, which can cope with rotary angle ranges of the plurality of types of arms.

6 Claims, 15 Drawing Sheets

FOREIGN PATENT DOCUMENTS

| | | |
|---|---|---|
| JP | A-06-174529 | 6/1994 |
| JP | A-09-021681 | 1/1997 |
| JP | A-2001-124614 | 5/2001 |
| JP | A-2001-124615 | 5/2001 |
| JP | A-2001-124616 | 5/2001 |
| JP | A-2002-013969 | 1/2002 |
| JP | 2002-206945 | 7/2002 |
| JP | A-2002-206959 | 7/2002 |
| JP | A-2003-172652 | 6/2003 |
| JP | A-2003-172653 | 6/2003 |
| JP | A-2003-177051 | 6/2003 |
| JP | A-2004-333283 | 11/2004 |

\* cited by examiner

LIQUID LEVEL DETECTOR

CROSS REFERENCE TO RELATED APPLICATIONS

This application is a divisional of U.S. patent application Ser. No. 11/004,937, filed on Dec. 7, 2004 which is based on Japanese Patent Application No. 2004-74891 filed on Mar. 16, 2004, the disclosures of which are incorporated herein by reference.

BACKGROUND OF THE INVENTION

1. Field of the Invention

The present invention relates to a liquid level detector for detecting a level of a liquid stored in a container. More particularly, the present invention relates to a non-contact type liquid level detector in which a magnetoelectric conversion element is used.

2. Description of the Related Art

This type liquid level detector is used, for example, for monitoring the amount of fuel accommodated in a fuel tank of an automobile.

For example, this type liquid level detector includes: a float which floats on liquid, the level of which is an object to be measured; a magnet holder for holding a magnet and having a hole portion; an arm for connecting the float with the magnet holder so that a vertical motion of the float can be converted into a rotary motion of the magnet holder; a main body portion having a shaft portion, for pivotally holding the magnet holder so that the magnet holder can be freely rotated around the shaft portion when the shaft portion is engaged in the hole portion; and a magnetoelectric conversion element fixed to the main body portion so that the magnetoelectric conversion element can cross a magnetic flux of the magnet, wherein a rotary angle of the magnet holder, that is, a liquid level is detected when a magnetic flux density of the magnet, which crosses the magnetoelectric conversion element, is detected by the magnetoelectric conversion element (Refer to Japanese Patent Publication No. 2002-206959).

In general, this type liquid level detector includes a regulating means for regulating a rotary angle range of the arm. Usually, a pair of regulating means are provided on both end sides of the rotary angle range of the arm. This regulating means includes a main body portion for pivotally holding a magnet holder and having a magnetoelectric conversion element. In the conventional liquid level detector described above, a flange for preventing the arm from coming out fulfills this function.

In this connection, the profile of a container, to which the liquid level detector is attached, varies, that is, the profile of a fuel tank of an automobile varies. Further, the range of fluctuation of a liquid level to be detected varies, that is, the range of fluctuation of a liquid level is changed from a state in which the fuel tank is filled with petrol to a state in which the fuel tank is empty.

In the liquid level detector, in order to cope with a plurality of types of ranges of liquid level detection, at least one of the arm length, that is, the radius of gyration of the float and the rotary angle range of the arm is adjusted.

Recently, the profile of a fuel tank of an automobile has become complicated. Therefore, the selection of the radius of gyration of the float is restricted. For the above reason, mainly, the rotary angle range of the arm is appropriately set according to the fluctuation range of the liquid level to be detected. In other words, it becomes necessary to provide many types of main body portions in which a position where the regulating means for regulating a rotary angle range of the arm is arranged is changed.

In general, the main body portion is made of resin, and the pair of regulating means described above are molded integrally with the main body portion. Accordingly, in order to set the regulating means at a plurality of positions, it becomes necessary to manufacture a plurality of molds for molding the main body portion. Due to the foregoing, problems are caused in which the manufacturing cost of the liquid level detector is increased.

SUMMARY OF THE INVENTION

The present invention has been accomplished in view of the above problems. It is an object of the present invention to provide a liquid level detector, the manufacturing cost of which is reduced.

In order to accomplish the above object, the present invention adopts the following technical means.

A liquid level detector of the first aspect of the present invention comprises: a rotary member; a fixing member for pivotally supporting the rotary member; a displacement member fixed to the rotary member and rotating integrally with the rotary member; a detection means for detecting a displacement of the displacement member, fixed to the fixing member; a float floating on the liquid; an arm, one end side of which is fixed to the float, the other end side of which is fixed to the rotary member, to convert a vertical motion of the float, which is caused by a vertical motion of a surface of the liquid, into a rotary motion of the rotary member; a stopper portion formed in the arm; and a pair of regulating means arranged in the fixing member and coming into contact with the stopper portion of the arm so as to regulate a rotary angle range of the rotary member, wherein the liquid level position is detected according to a position of the displacement member detected by the detection means, the fixing member is provided with a plurality of pairs of regulating means, and a rotary angle range of the rotary member, which is set by the pair of regulating means, is different for each pair of regulating means.

In the liquid level detector composed as described above, when the arm shape is changed and a pair of regulating means, with which the arm stopper portion is contacted, are changed, it is possible to change a rotary angle range of the rotary member. In general, the arm is composed of a metallic wire. Therefore, it is easy to manufacture a plurality of types of arms, and an increase in the cost of manufacturing the plurality of types of arms is small.

Due to the foregoing, it is possible to suppress an increase in the manufacturing cost caused in the conventional method in which many types of molds of molding the main body are prepared in the conventional liquid level detector so as to cope with the rotary angle ranges of a plurality of types of rotary members, and it is possible to provide a liquid level detector capable of coping with the rotary angle ranges of a plurality of types of arms.

In a liquid level detector according the second aspect of the present invention, the stopper portion provided in the arm is a linear portion, which is parallel with a rotary shaft of the rotary member, formed in the other side end portion of the arm.

In this case, the linear portion parallel with the rotary shaft of the rotary member can be formed in an easy step of bending the other end portion side of the arm. Therefore, while an increase in the manufacturing cost is being suppressed, it is possible to provide a liquid level detector capable of coping with the rotary angle ranges of a large number of types of arms.

In a liquid level detector according to the third aspect of the present invention, the stopper portion provided in the arm is a linear portion, which is parallel with a rotary shaft of the rotary member, formed between the rotary member and the float.

In this case, the linear portion parallel with the rotary shaft of the rotary member can be formed in an easy step of bending a middle portion of the arm. Therefore, while an increase in the manufacturing cost is being suppressed, it is possible to provide a liquid level detector capable of coping with the rotary angle ranges of a large number of types of arms.

In a liquid level detector according to the fourth aspect of the present invention, the displacement member is a permanent magnet, and the detection means is a magnetic detection element.

In this case, the detection means can detect a position of the displacement member under a condition of non-contact, that is, a rotary angle of the rotary member can be highly accurately detected.

In a liquid level detector according to the fifth aspect of the present invention, the displacement member is a sliding piece composed of an electrically conductive member, and the detection means is a resistance element in which the sliding piece is slidably arranged.

In this case, the sliding piece and the resistance element are inexpensive. Therefore, it is possible to highly accurately detect a rotary angle of the rotary member by a detection means of low cost.

A liquid level detector according to the sixth aspect of the present invention comprises: a float floating on the liquid, the level of which is an object to be measured; a magnet holder for holding a magnet and having a hole portion; an arm for connecting the float with the magnet holder so as to convert a vertical motion of the float into a rotary motion of the magnet holder; a main body portion having a shaft portion, for pivotally holding the magnet holder so that the magnet holder can be freely rotated around the shaft portion when the shaft portion is engaged in the hole portion; and a magnetoelectric conversion element fixed to the main body portion so that the magnetoelectric conversion element can cross a magnetic flux of the magnet, wherein a magnetic flux density of the magnet, which crosses the magnetoelectric conversion element, is detected by the magnetoelectric conversion element, and a rotary angle of the magnet holder, that is, a liquid level is detected according to this detection signal, the shaft portion including: a large diameter portion engaging in the hole portion; a small diameter portion formed at a forward end portion of the large diameter portion concentrically with the large diameter portion; a first protruding portion provided at a forward end portion of the small diameter portion so that the first protruding portion can extend in the radial direction of the small diameter portion in a portion of the outer circumference of the small diameter portion; a second protruding portion provided at a forward end side end portion of the shaft portion of the inner wall of the hole portion so that the second protruding portion can extend in the radial direction of the hole portion; and a stopper provided in the main body portion, coming into contact with an end portion of the arm on the opposite side to the float so as to regulate a rotary range of the magnet holder around the shaft portion, wherein a contour line of the first protruding portion in the axial direction of the shaft portion is included in a contour line of the large diameter portion in the axial direction of the shaft portion, the second protruding portion provided on the inner wall of the hole portion is formed so that the first protruding portion of the shaft portion can pass through and, when the magnet holder is at least in the rotary range, the second protruding portion comes into contact with the first protruding portion so that the second protruding portion can not be moved being separated from the main body portion of the magnet holder.

Due to the above structure, a contour shape of the opening portion of the hole portion of the magnet holder on the opposite side to the main body portion is composed of an arc, which is a contour line of the hole portion, and also composed of a contour line of the second protruding portion. In other words, a portion of the hole portion is closed. Further, the contour shape of the opening portion is formed into a shape in which the first protruding portion of the shaft portion can pass through under the condition that the hole portion of the magnet holder is engaged with the large diameter portion of the shaft portion.

Accordingly, in the assembling step of the liquid level detector of the sixth aspect of the present invention, when the first protruding portion of the shaft portion is made to pass through the opening portion on the opposite side to the main body portion of the hole portion, the magnet holder, to which the arm has not been attached yet, is attached to the main body portion. Then, the magnet holder is rotated to either the right or the left, and the first protruding portion of the shaft portion is made to come into contact with the second protruding portion of the hole portion of the magnet holder. In this way, the magnet holder can be prevented from coming out.

Due to the foregoing, a flange for preventing a magnet holder from coming out, which is provided in the conventional liquid level detector, can be made unnecessary, that is, it becomes unnecessary to attach the flange for preventing a magnet holder from coming out. Accordingly, it is possible to realize a liquid level detector in which the number of parts and the time for assembling can be reduced.

After the magnet holder, to which the arm has not been attached yet, that is, the single body of the magnet holder, is attached to the main body portion, when the magnet holder is at least in the rotary range of the liquid level detector, the magnet holder can be prevented from coming out from the main body portion. In other words, under the condition that the arm has not been attached yet, it is possible to conduct electric characteristic checking work on the liquid level detector. Alternatively, it is possible to conduct a detection signal adjusting work on the liquid level detector. Accordingly, the work can be conducted under the condition that the arm has not been attached yet, that is, the work can be conducted under the condition that the constitution of the liquid level detector is small. Therefore, the working property of the electric characteristic checking work or the detection signal adjusting work of the liquid level detector can be enhanced.

In a liquid level detector according to the seventh aspect of the present invention, the magnet holder includes an engaging portion having a groove, and the arm is held by and fixed into the groove by an elastic force of the engaging portion.

In this case, when the arm is inserted into the groove of the engaging portion while the engaging portion is being elastically deformed, the arm can be completely attached to the magnet holder. Due to the foregoing, the arm can be easily, positively fixed to the engaging portion. Therefore, the arm can be easily attached to the magnet holder.

In a liquid level detector according to the eighth aspect of the present invention, the engaging portion includes an opening portion and holding portion, a cross sectional shape of the holding portion perpendicular to the axial direction is rectangular or circular, the width or the inner diameter of the cross sectional shape is set smaller than the outer diameter of the arm, and the width of the opening portion perpendicular to the axial direction is set smaller than the width or the inner diameter of the holding portion.

Due to the foregoing, when the arm is attached to the engaging portion, the engaging portion can be positively, elastically deformed. Therefore, the arm can be positively fixed to the engaging portion. Further, after the arm has been attached to the engaging portion, the arm is continuously given an elastic force generated by the elastic deformation of the engaging portion. Therefore, it is possible to prevent the arm from being disconnected from the engaging portion in the process of using the liquid level detector.

In a liquid level detector according to the ninth aspect of the present invention, the magnet holder has a through-hole parallel with the hole portion, and the arm is engaged in the through-hole.

In this case, the arm is held by both the engaging portion of the magnet holder and the through-hole. Therefore, a positional relation between the arm and the magnet holder can be accurately maintained. Accordingly, the fluctuation of the detection characteristic among products of the liquid level detector products can be reduced.

A liquid level detector according to the fourteenth aspect of the present invention, in the first aspect comprises: a float floating on the liquid, the level of which is an object to be measured; a magnet holder for holding a magnet and having a hole portion; an arm for connecting the float with the magnet holder so as to convert a vertical motion of the float into a rotary motion of the magnet holder; a main body portion having a shaft portion, for pivotally holding the magnet holder so that the magnet holder can be freely rotated around the shaft portion when the shaft portion is engaged in the hole portion; a magnetoelectric conversion element built in the main body portion so that the magnetoelectric conversion element can cross a magnetic flux of the magnet; and a terminal built in the main body portion, for electrically connecting the magnetoelectric conversion element with the outside, wherein one end of the terminal is connected to the magnetoelectric conversion element and the other end of the terminal is extended outside from the end portion of the main body, the magnetoelectric conversion element detects a magnetic flux density of the magnet crossing the magnetoelectric conversion element and a rotary angle of the magnet holder, that is, the liquid level is detected according to the detection signal, the main body portion is made of resin material, a rubber member is arranged between the end portion and the magnetoelectric conversion element so that the rubber member can be closely contacted with the entire circumference of the terminal, the rubber member is integrated with the terminal into one body when the rubber member is molded by means of injection molding in which the terminal is inserted, and the rubber member, which is integrated with the magnetoelectric conversion element and the terminal into one body, is subjected to injection molding into the main body portion at the time of molding.

In this case, the rubber member is baked onto a surface of the terminal. Therefore, air tightness between the two can be positively maintained. Further, when the rubber member is subjected to injection molding into the main body portion, the rubber member is deformed by being compressed. Accordingly, even after the completion of molding, air tightness between the rubber member and the main body portion can be positively maintained by the elastic force of the rubber member. Consequently, even when the liquid level detector is dipped in liquid, it is possible to positively prevent the liquid from soaking into the periphery of the magnetoelectric conversion element.

Further, as the rubber member is previously integrated with the terminal into one body and built in the main body portion by means of injection molding, the number of parts and the time for assembling can be reduced.

Due to the foregoing, it is possible to provide a liquid level detector in which the number of parts and the time for assembling are reduced and liquid is prevented from soaking into the periphery of the magnetoelectric conversion element.

In this connection, according to the fourteenth aspect of the present invention, in the first aspect, the rubber member is previously integrated with the terminal into one body at the time of molding the rubber member in the first aspect. Therefore, even when the number of the terminals is plural, all terminals can be simultaneously and easily integrated with the rubber member into one body. Accordingly, it is possible to provide a liquid level detector in which the number of parts and the number of man-days for assembling are reduced and liquid is prevented from soaking into the periphery of the magnetoelectric conversion element irrespective of the number of the terminals.

A liquid level detector according to the fifteenth aspect of the present invention, in the first aspect, a portion of the rubber member is exposed from the end portion to the outside of the main body portion.

In this case, when an exposed portion of the rubber member is pushed and, for example, when the rubber member is deformed being compressed by pushing a portion of a connector to the rubber member in the case of attaching the connector of the external wiring to the main body portion of the liquid level detector, the contact pressure between the rubber member and the main body portion can be increased, and the sealing property between them can be enhanced.

A method of manufacturing the liquid level detector according to the sixteenth aspect of the present invention, comprises: a step of connecting the magnetoelectric conversion element with the terminal; a step of integrating the rubber member with the terminal, to which the magnetoelectric conversion element is connected, by means of molding; and a step in which the terminal, to which the magnetoelectric conversion element is connected, which is integrated with the rubber member into one body by means of molding, is subjected to injection molding into the main body portion.

Due to the foregoing, it is possible to provide a method of manufacturing a liquid level detector in which liquid can be prevented from soaking into the periphery of the magnetoelectric conversion element.

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

BRIEF DESCRIPTION OF THE DRAWINGS

In the drawings:

FIG. 9 is a front view showing the fuel level gauge 1 of the fourth embodiment of the present invention, wherein FIG. 9 shows a state in which the liquid level 91 is the lowest;

FIG. 15 is a front view showing the fuel level gauge 1 of the fifth embodiment of the present invention, wherein FIG. 15 shows a state in which the liquid level 91 is the lowest;

DESCRIPTION OF PREFERRED EMBODIMENTS

Figure 1:
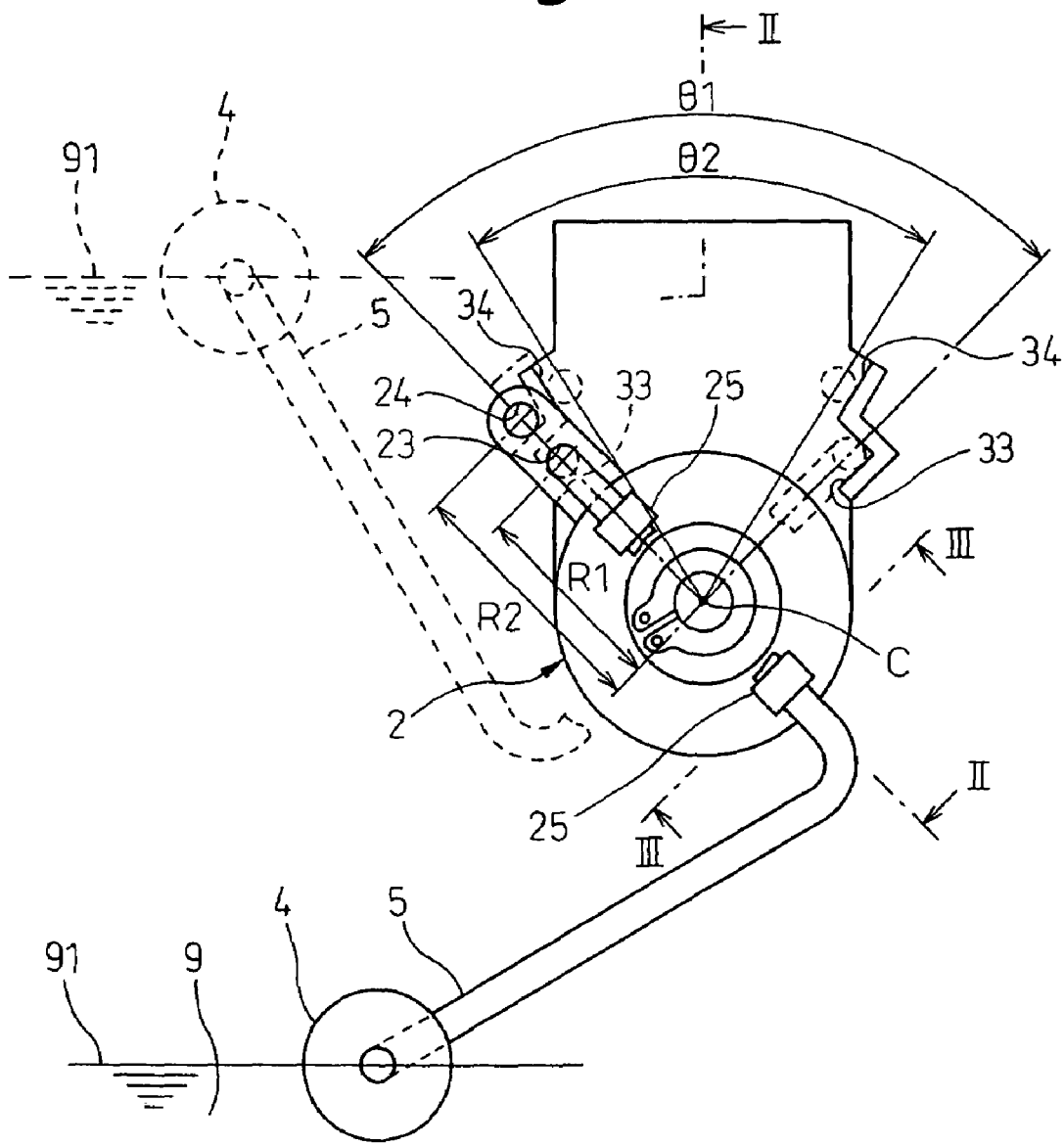
FIG. 1 is a front view showing the fuel level gauge 1 of the first embodiment of the present invention.

Referring to the drawings, explanations will be made into an example in which the liquid level detector of the embodiment of the present invention is applied to a fuel level gauge attached into a fuel tank of an automobile so that a level of fuel in the fuel tank can be detected. In this connection, the same components are indicated by the same reference characters in the drawings.

First of all, the first embodiment of the present invention will be explained below. FIG. 1 is a front view showing a fuel level gauge 1 which is a liquid level detector of the first embodiment of the present invention. In FIG. 1, each component of the fuel level gauge 1 shows a state in which the liquid level 91 of fuel 9 is located at the lowest position. In FIG. 1, the highest state of the liquid level 91 of fuel is shown by the broken line, that is, the liquid level 91, the float 4 and the arm 5 at the time when the fuel tank is filled with fuel are shown by the broken line. In this connection, in order to facilitate the understanding, a portion of the arm is broken and omitted in FIG. 1.

Figure 2:
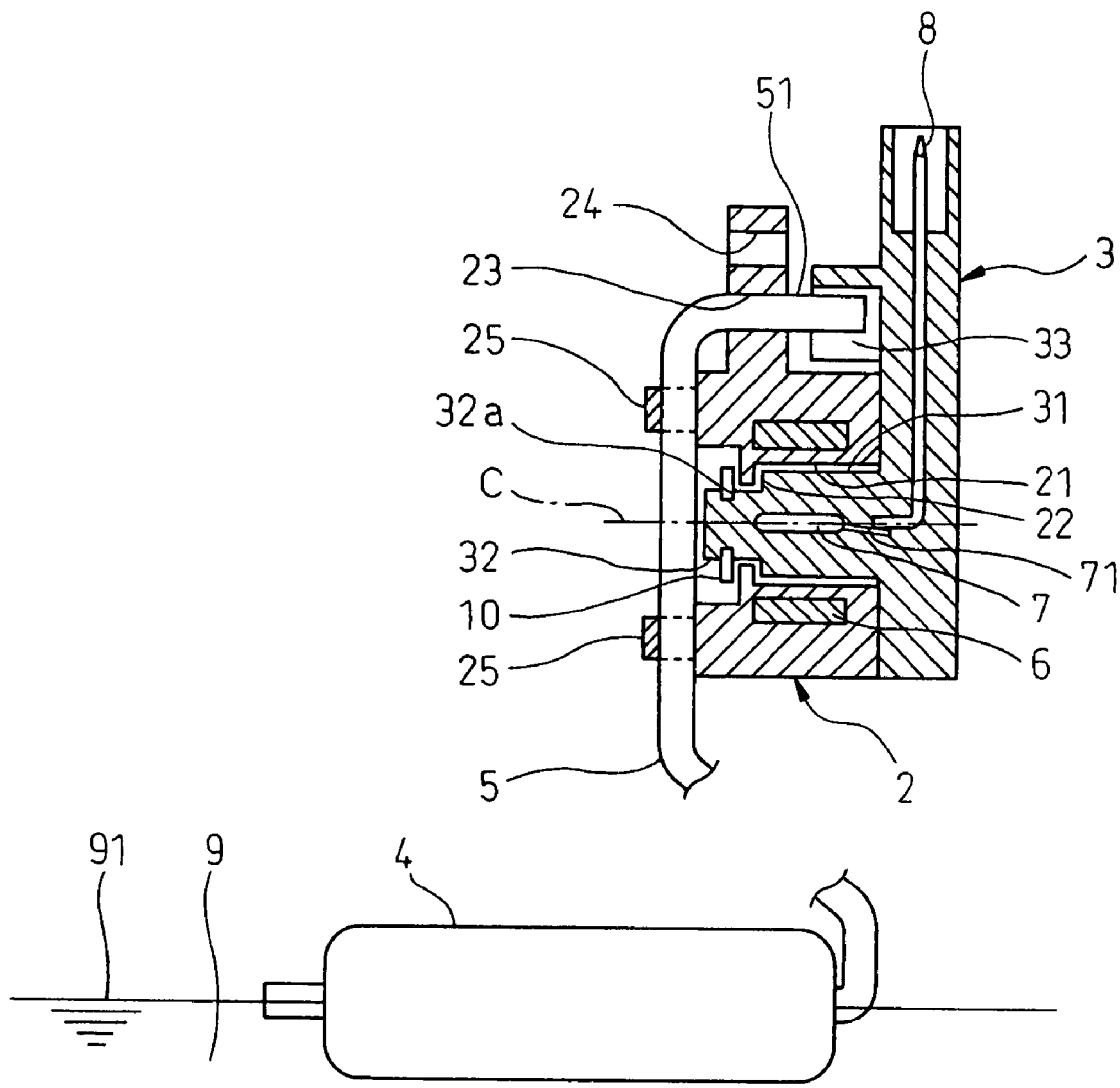
FIG. 2 is a sectional view taken on line II-II in FIG. 1 showing the fuel level gauge 1 of the first embodiment of the present invention.

FIG. 2 is a sectional view showing the fuel level gauge 1 of the first embodiment taken on line II-II in FIG. 1.

In this connection, in FIGS. 1 and 2, the upper part indicates an upper part of the fuel level gauge 1 attached to the automobile concerned.

Figure 3:
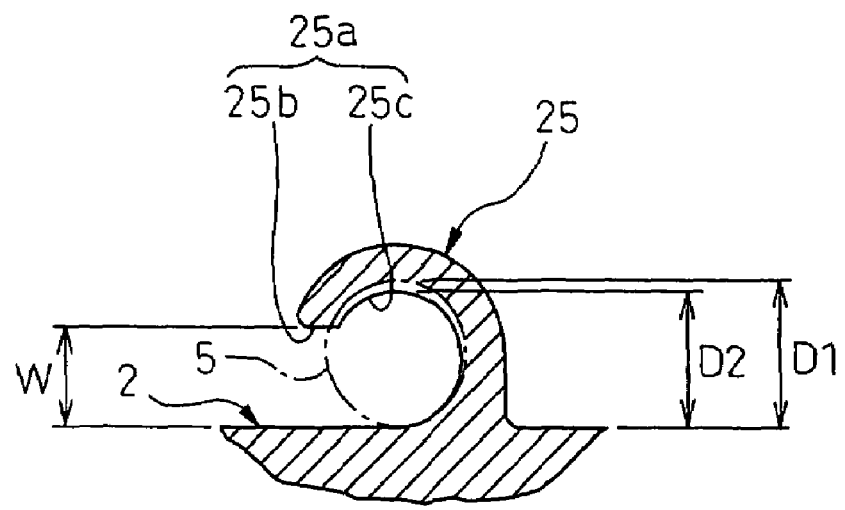
FIG. 3 is a sectional view taken on line III-III in FIG. 1 showing the fuel level gauge 1 of the first embodiment of the present invention.

FIG. 3 is a partially sectional view taken on line III-III in FIG. 1 showing the fuel level gauge 1 of the first embodiment of the present invention.

Figure 4:
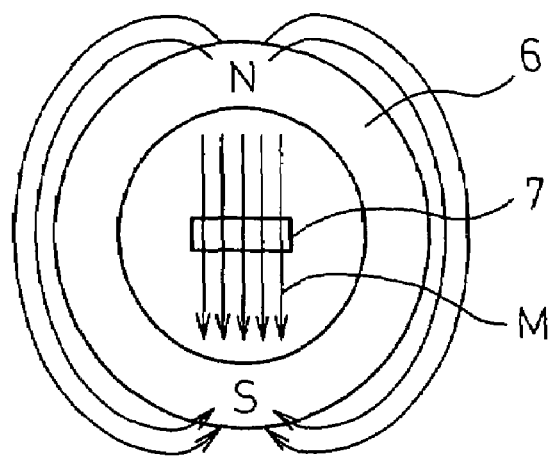
FIG. 4 is a view showing a model for explaining a state of magnetization and a distribution of the magnetic flux of the magnet 6 in the fuel level gauge 1 of the first embodiment of the present invention.

FIG. 4 is a view showing a model for explaining a state of magnetization and a distribution of the magnetic flux of the magnet 6 in the fuel level gauge 1 of the first embodiment of the present invention.

The fuel gauge 1 is fixed in a fuel tank (not shown), in which liquid fuel 9 is accommodated, so as to detect the liquid level 91.

The magnet holder 2, which is a rotary member, is made of, for example, resin. As shown in FIG. 2, the magnet 6, which is a permanent magnet used as a displacement member, is fixed to the magnet holder 2, and the magnet holder 2 is pivotally engaged with the body 3 which is a main body portion described later. Due to the above structure, when the magnet holder 2 is rotated with respect to the body 3, the magnet 6 is also rotated integrally with the magnet holder 2, that is, the magnet 6 is displaced with respect to the body 3.

As shown in FIG. 1, the arm 5 is fixed to the magnet holder 2. The arm 5 is composed of, for example, a metallic rod. As shown in FIG. 1, the float 4 is fixed to one end portion of the arm 5, and the other end portion of the arm 5 is fixed to the magnet holder 2. As shown in FIG. 2, the end portion of the arm 5 on the opposite side to the float 4 is bent to the body 3 side making a substantially right angle. In this way, the bent portion of the arm 5 composes the stopper 51 which is a stopper portion. The stopper 51 is formed in parallel with the rotary shaft of the magnet holder 2, that is, the stopper 51 is formed in parallel with the central axis of the hole portion 21 described later. When this stopper portion 51 is engaged in the first fixing hole 23 of the magnet holder 2, the positional relation between the arm 5 and the magnet holder 2 can be regulated. In other words, when this stopper portion 51 is engaged in the first fixing hole 23 of the magnet holder 2, the arm 5 is fixed to the magnet holder 2. As shown in FIG. 1, the stopper 51 comes into contact with the stopper 33 which is a regulating means formed in the body 3 described later. Due to the above structure, the range of the rotary angle of the magnet holder 2 can be regulated. That is, in the fuel level gauge 1 of the first embodiment of the present invention, the range of the rotary angle of the magnet holder 2 is regulated at the angle θ1 as shown in FIG. 1.

The float 4 is made of resin, and the apparent specific gravity of the float 4 is set at a value so that the float 4, which is attached to the arm 5, can positively float on the liquid surface 91 of fuel. When the float 4 is moved upward and downward according to the fluctuation of the liquid level 91, this movement is transmitted to the magnet holder 2 by the arm 5, and the magnet holder 2 is rotated with respect to the body 3. That is, the arm 5 fulfills a function of changing a positional fluctuation of the liquid level 91, which is moved upward and downward, into a rotary motion of the magnet holder 2.

The structure of the magnet holder 2 will be explained in detail as follows.

As shown in FIG. 2, the magnet holder 2 is provided with a hole portion 21 pivotally engaged with the shaft portion 31 of the body 3 described later. At the end portion of the hole portion 21 of the magnet holder 2 in the axial direction on the opposite side to the body 3 (on the left in FIG. 2), the regulating portion 22 is provided which regulates a movement of the magnet holder 2 in the axial direction (the lateral direction in FIG. 2) under the condition that the magnet holder 2 is assembled to the body 3. The magnet holder 2 includes a first fixing hole 23 engaged with the stopper 51 provided in the arm 5. As shown in FIG. 1, the first fixing hole 23 is formed at a position distant from the rotary shaft C of the magnet holder 2 by the distance R1, that is, the first fixing hole 23 is formed at a position of the radius R1. Due to the foregoing, the radius of gyration of the stopper 51 of the arm 5 is R1. The magnet holder 2 includes a second fixing hole 24 at a position distant from the rotary shaft C of the magnet holder 2 by the distance R2, that is, the second fixing hole 24 is formed at a position of the radius R2. The diameter of the second fixing hole is the same as the diameter of the first fixing hole 23. As shown in FIG. 2, the first fixing hole 23 and the second fixing hole 24 are formed in parallel with the hole portion 21 of the magnet holder 2. The diameters of the first fixing hole 23 and the second fixing hole 24 are the same as the diameter D1 of the arm 5 or smaller than the diameter D1 of the arm 5. That is, the diameters of the first fixing hole 23 and the second fixing hole 24 and the diameter D1 of the arm 5 are determined as follows. When the arm 5 is attached to the magnet holder 2 in the step of assembling the fuel level gauge 1, the arm 5 can be easily inserted into the first fixing hole 23 or the second fixing hole 24 by hand in such a manner that the interference fit can be accomplished so that the arm 5 can be rotated by hand after the arm 5 has been inserted into the first fixing hole 23 or the second fixing hole 24.

As shown in FIG. 2, the magnet holder 2 has an engaging portion 25 for holding the arm 5.

As shown in FIGS. 1 and 2, in the fuel level gauge 1 of the embodiment of the present invention, two engaging portions 25 are respectively arranged on the end face of the magnet holder 2 on the opposite side to the body 3. As shown in FIG. 3, the engaging portion 25 is provided with a groove 25a in which the arm 5 is held and fixed. As shown in FIG. 3, the groove 25a includes an opening portion 25b and a holding portion 25c. In this connection, FIG. 3 is a view of the engaging portion 25 to which the arm 5 has not been attached yet. Therefore, the arm 5 is illustrated by the one-dotted chain line. As shown in FIG. 3, the cross-sectional shape of the holding portion 25c in the axial direction, that is, the cross-sectional shape of the holding portion 25c in the direction perpendicular to the horizontal direction of the surface of FIG. 3 is formed into a circle, and the diameter D2 of the holding portion 25c is smaller than the diameter D1 of the arm 5. The width W of the opening portion 25b in the axial direction, that is, the width W of the opening portion 25b in the direction perpendicular to the vertical direction of the surface of FIG. 3 is smaller than the diameter D2 of the holding portion 25c as shown in FIG. 3. In the case where the arm 5 is attached into the groove 25a of the engaging portion 25, when the arm 5 is pushed into the groove 25a of the engaging portion 25 from the left of FIG. 3, the engaging portion 25 is elastically deformed and the arm 5 is held by and fixed to the holding portion 25c. At this time, the engaging portion 25 is elastically deformed and the arm 5 is held by an elastic force of the engaging portion 25. The two engaging portions 25 are arranged in such a manner that the central axes of the respective holding portions 25c are made to coincide with each other. Further, the central axis, which is common between both holding portions 25c, crosses the central axes of the first fixing hole 23 and the second fixing hole 24.

As the fixing holes 23, 24 and the engaging portions 25 of the magnet holder 2 are formed into the above shapes and arranged according to the above positional relation, the arm 5 can be easily attached to the magnet holder 2 in the step of assembling the fuel level gauge 1. That is, first, the stopper 51 of the arm 5 is engaged in the first fixing hole 23 or the second fixing hole 24. Successively, while the arm 5 is being rotated around the first fixing hole 23 or the second fixing hole 24, the arm 5 is pushed into the groove 25a of the engaging portion 25 so that the arm 5 can be completely engaged with the holding portion 25c. In this way, the arm 5 can be easily fixed to the magnet holder 2.

The magnet 6, which is a permanent magnet to be used as a displacement member, is fixed into the magnet holder 2. The magnet 6 is composed of, for example, a ferrite magnet. In the fuel level gauge 1 of the embodiment of the present invention, a cylindrical type ferrite magnet is used. As shown in FIG. 2, the magnet 6 is arranged concentrically with the hole portion 21. Further, as shown in FIG. 4, the magnet 6 is magnetized by two poles. The magnetic flux M flows as shown in FIG. 4. The magnetic flux on the inner circumferential side of the magnet 6 flows in the radial direction of the hole portion 21. In the fuel level gauge 1 of the embodiment of the present invention, at the time of forming the magnet holder 2 by means of molding, the magnet 6 is integrally formed in the magnet holder 2 by means of injection molding.

The body 3, which is a main body portion, is made of, for example, resin. As shown in FIG. 2, the body 3 includes a shaft portion 31. When the hole portion 21 of the magnet holder 2 is engaged with this shaft portion 31, the magnet holder 2 can be pivotally held. The body 3 includes: a Hall element 7 which is a magnetic detection element of the detection means for detecting a displacement of the magnet 6 which is a displacement member; and a terminal 8 for electrically connecting the Hall element 7 with the outside. The body 3 is provided with two pairs of regulating means for regulating the rotary angle range of the magnet holder 2. That is, the body 3 is provided with a pair of the first stoppers 33 and a pair of the second stoppers 34. In this connection, the fuel level gauge 1 of the embodiment of the present invention is fixed to a fuel tank (not shown) via the body 3.

The structure of the body 3 will be explained in detail as follows.

As shown in FIG. 2, on the forward end side of the shaft portion 31 which is engaged in the hole portion 21 of the magnet holder 2, the small diameter portion 32, the diameter of which is smaller than the shaft portion 31, is extended. As shown in FIG. 2, the groove portion 32a is provided in this small diameter portion 32. As shown in FIG. 2, the snap ring 10 is attached into this groove portion 32a. When the regulating portion 22 of the magnet holder 2 comes into contact with the snap ring 10, the magnet holder 2 is regulated so that it cannot be moved without being separated from the body 3 of the magnet holder 2, that is, the magnet holder 2 is regulated so that it cannot be moved to the left in FIG. 2.

As shown in FIG. 2, the Hall element 7, which is a magnetic detection element to be used as a detection means for detecting a displacement of the magnet 6 of the displacement member, is built in the shaft portion 31. As shown in FIG. 2, the Hall element 7 is arranged inside the magnet 6 in such a manner that the Hall element 7 overlaps the magnet 6 in the axial direction of the shaft portion 31 as long as possible. Due to the above structure, the amount of magnetic flux M of the magnet 6 crossing the Hall element 7 can be increased. Therefore, an output voltage of the Hall element 7 can be raised and the detection accuracy of detecting the liquid level 91 can be enhanced.

Operation of the Hall element 7 will be briefly explained here.

The Hall element 7 is composed of a semiconductor. When a magnetic field is given to the Hall element 7 from the outside under the condition that voltage is impressed upon the Hall element 7, Hall voltage proportional to the magnetic flux density passing through the Hall element 7 is generated. That is, when the Hall element 7 and the magnetic flux M make a right angle with each other, the magnetic flux density passing through the Hall element 7 is maximized, and the Hall voltage becomes maximum. When the Hall element 7 and the magnetic flux M become parallel with each other, the magnetic flux density passing through the Hall element 7 is minimized, and the Hall voltage becomes minimum.

In the fuel level gauge 1 of the embodiment of the present invention, when the magnet holder 2 is rotated by the fluctuation of the liquid level 91, a crossing angle of the Hall element 7 and the magnetic flux M of the magnet 6 is changed. According to the change in the crossing angle, the Hall voltage, which is an output voltage of the Hall element 7, is changed. Accordingly, when the Hall voltage is detected, the rotary angle of the magnet holder 2 can be measured, that is, the liquid level 91 can be measured.

The body 3 includes a terminal 8 for connecting the Hall element 7 with an electrical circuit provided outside. This terminal 8 is made of a conductive metal and one end portion of which is electrically connected with the lead 71 of the Hall element 7. This connection is made, for example, by means of caulking or fusing. On the other hand, the other end of the terminal 8 is extruded outside from the body 3 and connected with a connector (not shown) of a wire harness (not shown) provided outside. In the fuel level gauge 1 of the embodiment of the present invention, the Hall element 7 and the terminal 8 are integrally formed by means of injection molding at the time of resin molding.

The body 3 includes two pairs of regulating means for regulating a rotary angle range of the magnet holder 2. That is, as shown in FIG. 1, the body 3 includes a pair of the first stoppers 33 and a pair of the second stoppers 34. The first stopper 33 is arranged at a position corresponding to the first fixing hole 23 of the magnet holder 2. That is, the first stopper 33 is formed at a position where the first stopper 33 comes into contact with the stopper 51 as shown in FIG. 1 in the case where the stopper 51 of the arm 5 is engaged in the first fixing hole 23 so that the arm 5 can be fixed to the magnet holder 2. Therefore, the first stopper 33 regulates the rotary angle range of the magnet holder 2 at θ1.

On the other hand, the second stopper 34 is arranged at a position corresponding to the second fixing hole 24 of the magnet holder 2. That is, the second stopper 34 is formed at a position where the second stopper 34 comes into contact with the stopper 51 in the case where the stopper 51 of the arm 5 is engaged in the second fixing hole 24 so that the arm 5 can be fixed to the magnet holder 2. Therefore, the second stopper 34 regulates the rotary angle range of the magnet holder 2 at θ2.

In this case, the rotary angle range θ1 of the magnet holder 2, which is regulated by a pair of the first stoppers 33, and the rotary angle range θ2 of the magnet holder 2, which is regulated by a pair of the second stoppers 34, are respectively set at values different from each other.

As explained above, in the fuel level gauge 1 of the first embodiment of the present invention, two pairs of regulating means are provided which come into contact with the stopper 51 of the arm 5 integrally fixed to the magnet holder 2 so that the rotary angle range of the magnet holder 2 can be regulated, that is, the first stoppers 33 and the second stoppers 34 are provided, and the rotary angle range of the magnet holder 2 regulated by a pair of stoppers 33 and the rotary angle range of the magnet holder 2 regulated by a pair of stoppers 34 are set to be different from each other.

In the conventional liquid level detector, in the case of manufacturing a liquid level detector, the rotary angle range of the magnet holder of which is different from that of the existing liquid level detector, it is necessary to prepare a new mold each time which is used for resin molding of the body. Therefore, when the rotary angle range of the magnet holder is changed in the liquid level detector, the manufacturing cost is raised.

On the other hand, in the fuel level gauge 1 of the first embodiment of the present invention, when the arm 5 is changed and the position where the arm 5 is attached to the magnet 2 is changed, that is, the first fixing hole 23 or the second fixing hole 24 is changed, the rotary angle range of the magnet holder 2 can be changed to either θ1 or θ2. In other words, when the body 3 is made to be a common part and a plurality of shapes of arms 5 are manufactured, it is possible to set a plurality of types of level gauges 1, the rotary angle ranges of the magnet holders 2 of which are different from each other. In this case, it is easy to manufacture a plurality of types of arms, and an increase in the manufacturing cost is small.

Due to the foregoing, while the number of the types of the molds for resin molding of the body 3 is being suppressed and the increase in the manufacturing cost is being prevented, it is possible to provide a fuel level gauge 1 capable of coping with the rotary angle ranges of various types of arms 5.

Figure 5:
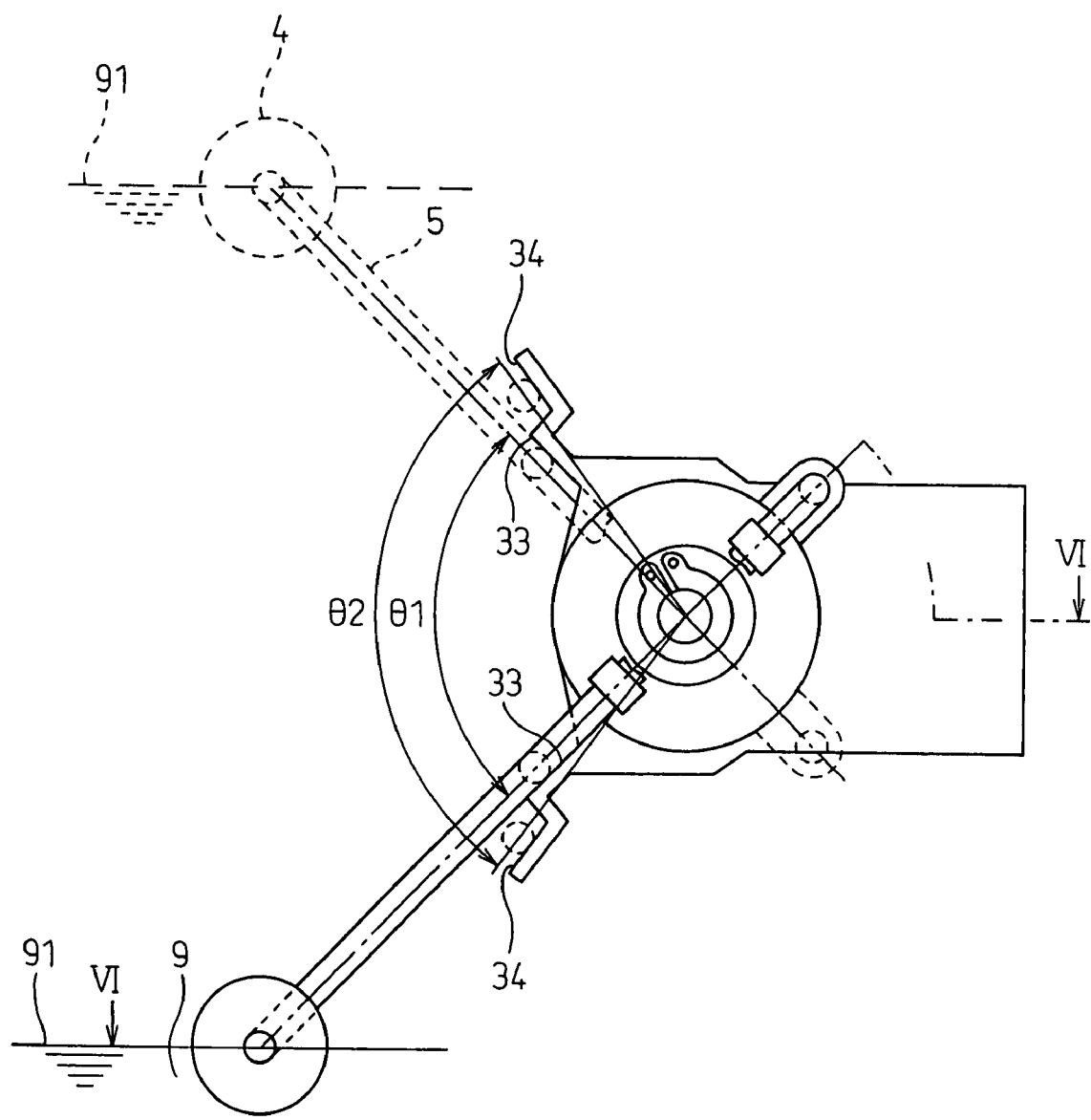
FIG. 5 is a front view showing the fuel level gauge 1 of the second embodiment of the present invention.

Next, the second embodiment will be explained below. FIG. 5 is a front view showing the fuel level gauge 1 of the second embodiment of the present invention. In this connection, in FIG. 5, the upper part indicates an upper part of the fuel level gauge 1 attached to the automobile concerned. In FIG. 5, each component of the fuel level gauge 1 shows a state in which the liquid level 91 of fuel 9 is located at the lowest position. In FIG. 5, the highest state of the fuel level 91 is shown by the broken line, that is, the liquid level 91, the float 4 and the arm 2 at the time when the fuel tank is filled with fuel are shown by the broken line.

Figure 6:
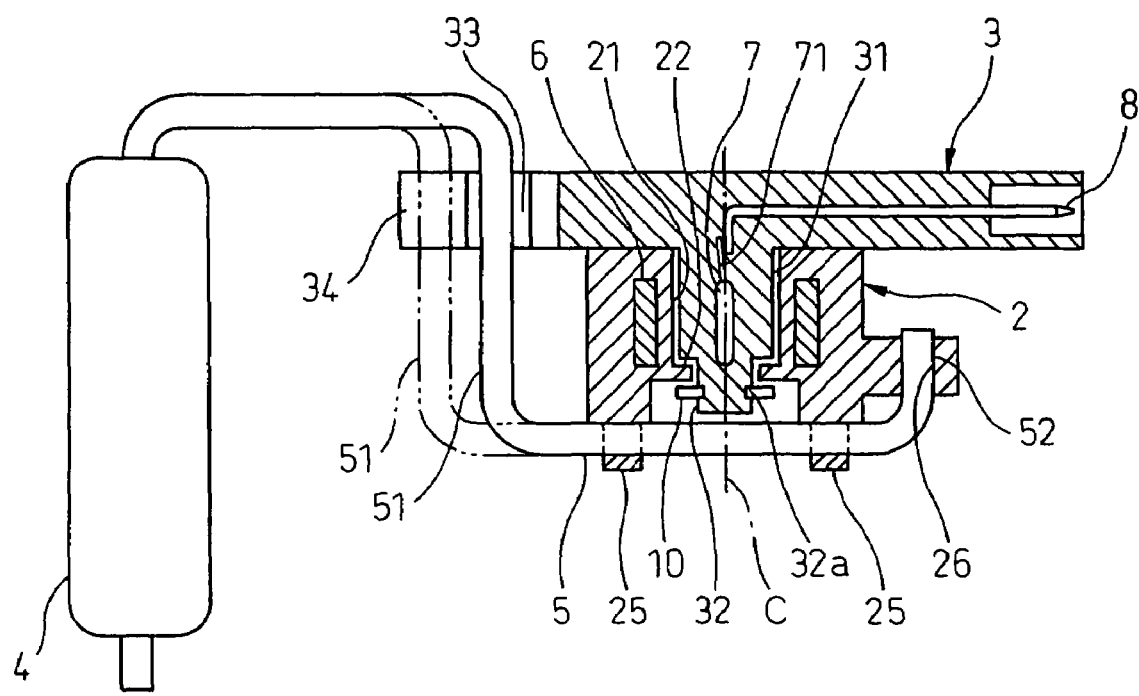
FIG. 6 is a sectional view taken on line VI-VI in FIG. 5 showing the fuel level gauge 1 of the second embodiment of the present invention.

FIG. 6 is a sectional view taken on line VI-VI in FIG. 5 showing the fuel level gauge 1 of the second embodiment of the present invention.

In the fuel level gauge 1 of the second embodiment of the present invention, shapes of the body 3 and the arm 5 are changed from those of the fuel level gauge 1 of the first embodiment of the present invention.

As shown in FIG. 6, in the arm 5, the position of the stopper 51, which is a stopper portion, is changed to a position between the magnet holder 2 and the float 4. In the fuel level gauge 1 of the second embodiment of the present invention, the stopper 51 is also formed in parallel with the rotary shaft C of the magnet holder 2. At the position of the stopper 51 in the fuel level gauge 1 of the first embodiment of the present invention, as shown in FIG. 6, the fixing portion 52 for fixing the stopper 51 to the magnet holder 2 is formed. The fixing portion 52 is also formed in parallel with the rotary shaft C of the magnet holder 2.

According to the change in the position of the stopper 51 in the arm 5, positions of the first stopper 33 and the second stopper 34, which are formed in the body 3, are changed to the positions shown in FIG. 5.

In the magnet holder 2, at the position of the first fixing hole 23 in the fuel level gauge 1 of the first embodiment of the present invention, as shown in FIG. 6, the fixing hole 26 for fixing the fixing portion 52 of the arm 5 is formed.

In this connection, the method of engaging the magnet holder 2 with the body 3 and the method of engaging the arm 5 with the magnet holder 2 are the same as those of the case of the fuel level gauge 1 of the first embodiment of the present invention.

In the fuel level gauge 1 of the second embodiment of the present invention, as shown in FIG. 5, when the stopper 51 of the arm 5 comes into contact with a pair of the first stoppers 33, the rotary angle range θ1 of the magnet holder 2 is regulated.

In the fuel level gauge 1 of the second embodiment of the present invention, the shape of the arm 5 is changed into the shape shown by the two-dotted chain line in FIG. 6. That is, when the stopper 51 of the arm 5 is made to come into contact with a pair of the second stoppers 34 arranged in the body 3, the rotary angle range of the magnet holder 2 can be changed from θ1 to θ2.

Accordingly, in the fuel level gauge 1 of the second embodiment of the present invention, in the same manner as that of the fuel level gauge 1 of the first embodiment, when the body 3 is made to be a common part and a plurality of shapes of arms 5 are manufactured, it is possible to provide a plurality of types of level gauges 1, the rotary angle ranges of the magnet holders 2 of which are different from each other. In this case, it is easy to manufacture a plurality of types of arms, and an increase in the manufacturing cost is small.

Due to the foregoing, while the number of the types of the molds for resin molding of the body 3 is being suppressed and the increase in the manufacturing cost is being prevented, it is possible to provide a fuel level gauge 1 capable of coping with the rotary angle ranges of various types of arms 5.

Figure 7:
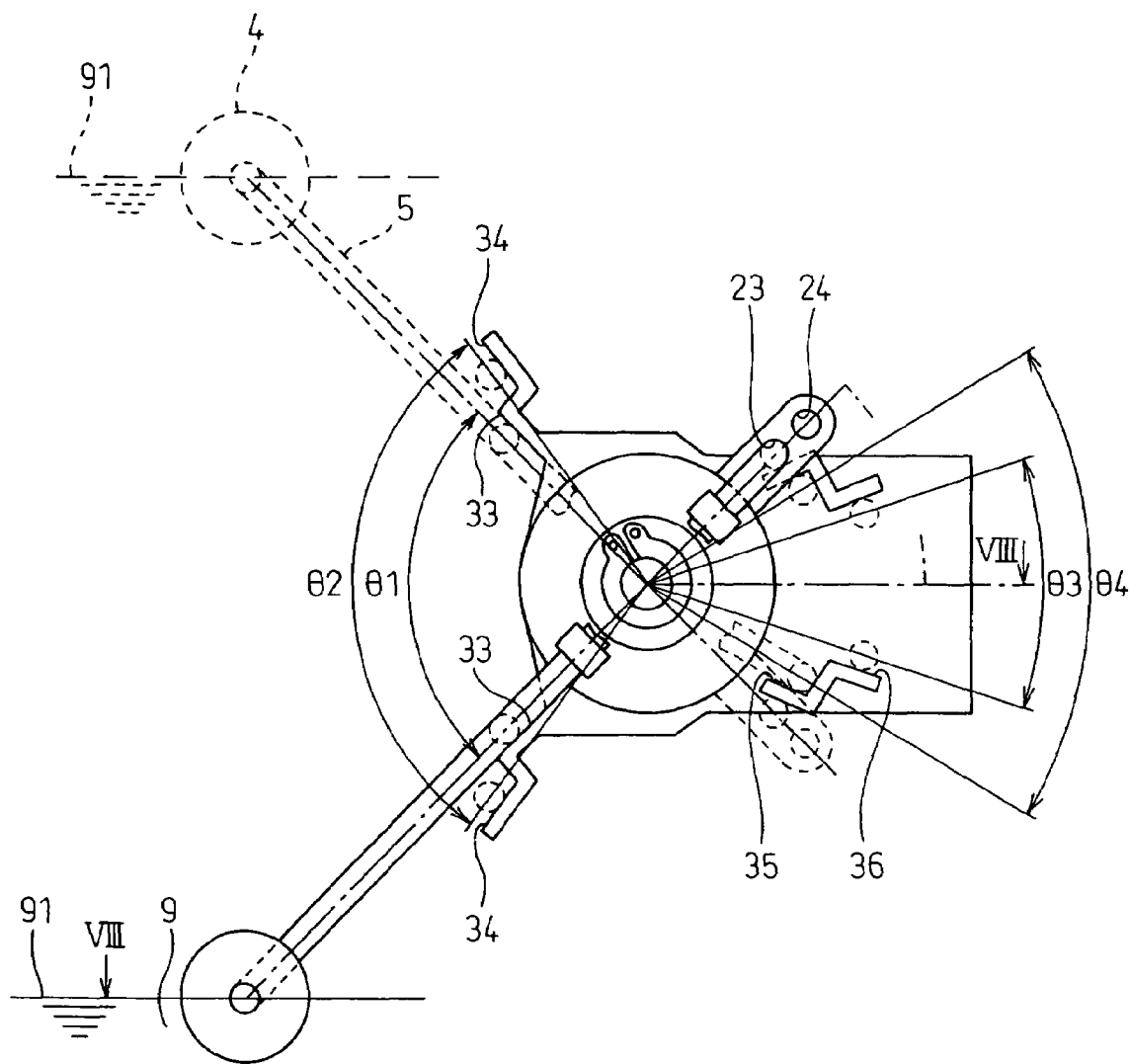
FIG. 7 is a front view showing the fuel level gauge 1 of the third embodiment of the present invention.

Next, the third embodiment will be explained below. FIG. 7 is a front view showing the fuel level gauge 1 of the third embodiment of the present invention. In this connection, in FIG. 7, the upper part indicates an upper part of the fuel level gauge 1 attached to the automobile concerned. In FIG. 7, each component of the fuel level gauge 1 shows a state in which the liquid level 91 of fuel 9 is located at the lowest position. In FIG. 7, the highest state of the fuel level 91 is shown by the broken line, that is, the liquid level 91, the float 4 and the arm 2 at the time when the fuel tank is filled with fuel are shown by the broken line.

Figure 8:
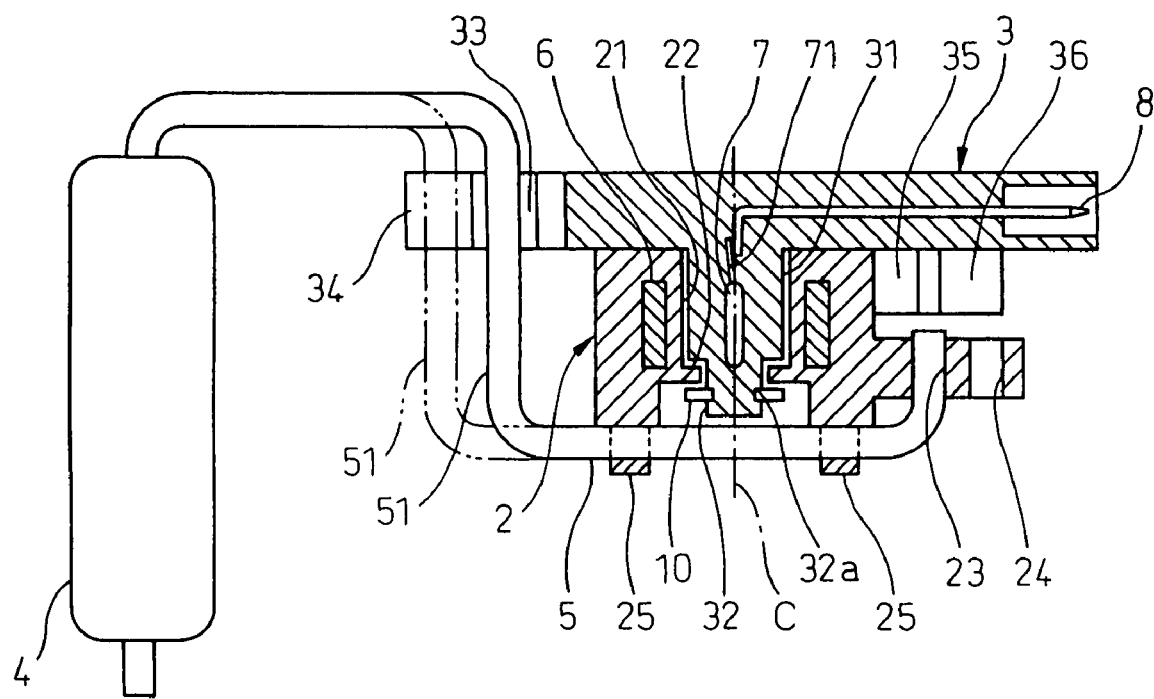
FIG. 8 is a sectional view taken on line VIII-VIII in FIG. 7 showing the fuel level gauge 1 of the third embodiment of the present invention.

FIG. 8 is a sectional view taken on line VIII-VIII in FIG. 7 showing the fuel level gauge 1 of the third embodiment of the present invention.

In the fuel level gauge 1 of the third embodiment of the present invention, shapes of the body 3 and the magnet holder 2 are changed from those of the fuel level gauge 1 of the second embodiment of the present invention.

The first stopper 33 and the second stopper 34, which are provided in the body 3 of the fuel level gauge of the first embodiment of the present invention, are added to the body 3 as the third stopper 35 and the fourth stopper 36 as shown in FIG. 7. Instead of the fixing hole 26 of the magnet holder 2 of the fuel level gauge of the second embodiment of the present invention, the first fixing hole 23 and the second fixing hole 24, which are provided by the magnet holder 2 of the fuel level gauge of the first embodiment of the present invention, are provided in the magnet holder 2 as shown in FIG. 8.

On the other hand, the shape of the arm 5 is the same as that of the fuel level gauge 1 of the second embodiment of the present invention.

In this connection, the method of engaging the magnet holder 2 with the body 3 and the method of engaging the arm 5 with the magnet holder 2 are the same as those of the case of the fuel level gauge 1 of the first embodiment of the present invention.

Accordingly, in the fuel level gauge 1 of the third embodiment of the present invention, as shown in FIG. 7, when the stopper 51 of the arm 5 comes into contact with a pair of the first stoppers 33, the rotary angle range θ1 of the magnet holder 2 is regulated in the same manner as that of the fuel level gauge of the second embodiment of the present invention. When the position of the stopper 51 of the arm 5 is arranged at the position shown by the two-dotted chain line in FIG. 8, the range of the rotary angle of the magnet holder 2 can be changed to θ2.

Further, when the shape of the arm 5 is made to be the same as that of the fuel level gauge 1 of the first embodiment of the present invention, that is, when the arm 5 is engaged in the first fixing hole 23 or the second fixing hole 24 of the magnet holder 2 and made to come into contact with the third stopper 35 or the fourth stopper 36, the rotary angle range of the magnet holder 2 can be changed to θ3 or θ4 as shown in FIG. 7.

The above will be summarized as follows. In the fuel level gauge 1 of the third embodiment of the present invention, when the body 3 and the magnet 2 are used in common and only the shape of the arm 5 is changed, the rotary angle range of the magnet holder 2 can be set at either θ1, θ2, θ3 or θ4.

Due to the foregoing, while the number of the types of the molds for resin molding of the body 3 is being suppressed and the increase in the manufacturing cost is being prevented, it is possible to provide a fuel level gauge 1 capable of coping with the rotary angle ranges of various types of arms 5.

In the fuel level gauges 1 of the first and the second embodiment of the present invention explained above, two pairs of the regulating means are provided, that is, a pair of the first stoppers 33 and a pair of the second stoppers 34 are provided. However, the present invention is not limited to the above specific embodiment in which two pairs of the regulating means are provided. Three or more pairs of regulating means may be provided.

In the fuel level gauge 1 of the third embodiment of the present invention explained above, a pair of the regulating means provided in the body 3 are provided in such a manner that two pairs are provided on the float 4 side with respect to the shaft portion 31, and two pairs are provided on the opposite side to the float 4 with respect to the shaft portion 31. However, it is not necessarily required that the same number of pairs are provided on both sides of the shaft portion 31. If necessary, the number of pairs may be different on both sides of the shaft portion 31. For example, two pairs may be provided on the float 4 side with respect to the shaft portion 31, and one pair may be provided on the opposite side to the float 4 with respect to the shaft portion 31. Alternatively, the setting may be made in the opposite way.

In the fuel level gauges 1 of the first to the third embodiment of the present invention, the magnet 6, which is a permanent magnet, is used as the displacement member, and the Hall element 7, which is a magnetic detection element, is used as the detection means. However, the displacement member and the detection means may be replaced with another type of component. For example, the displacement member may be a sliding piece composed of a conductive member, that is, the displacement member may be a so-called brush, and the detection means may be a resistance element. In this case, when the brush is rotated according to the fluctuation of the liquid level 91, a position of the contact point of the brush with the resistance element is changed. Therefore, the resistance value between the brush and the end portion of the resistance element is changed. The liquid level 91 can be measured according to this resistance value.

Figure 9:
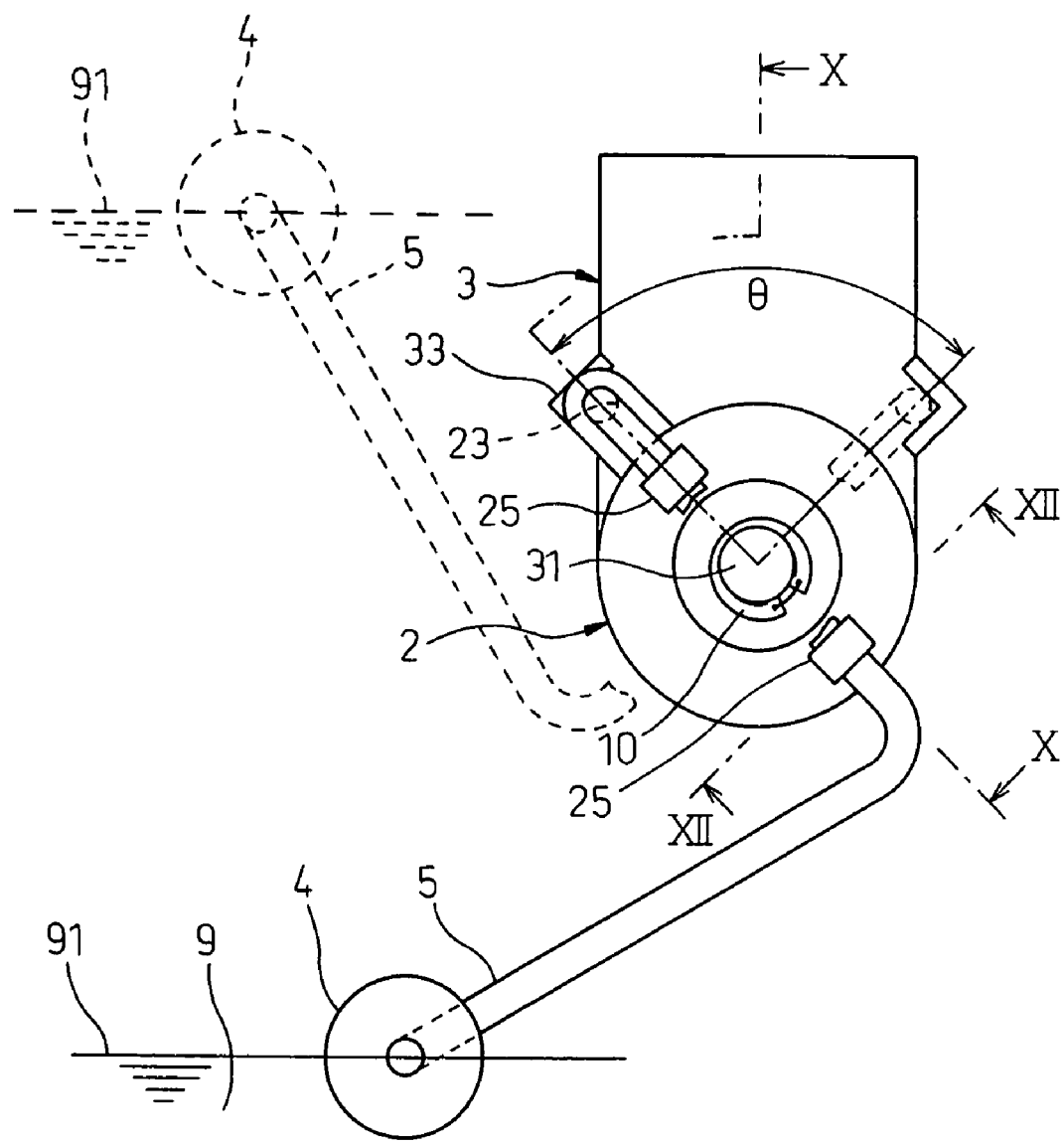

Next, the fourth embodiment will be explained below. FIG. 9 is a front view showing the fuel level gauge 1, which is a liquid level detector, of the fourth embodiment of the present invention, wherein FIG. 9 shows a state in which the liquid level 91 of fuel 9 is the lowest. In this connection, in order to facilitate understanding, a portion of the arm is broken and omitted in FIG. 9.

Figure 10:
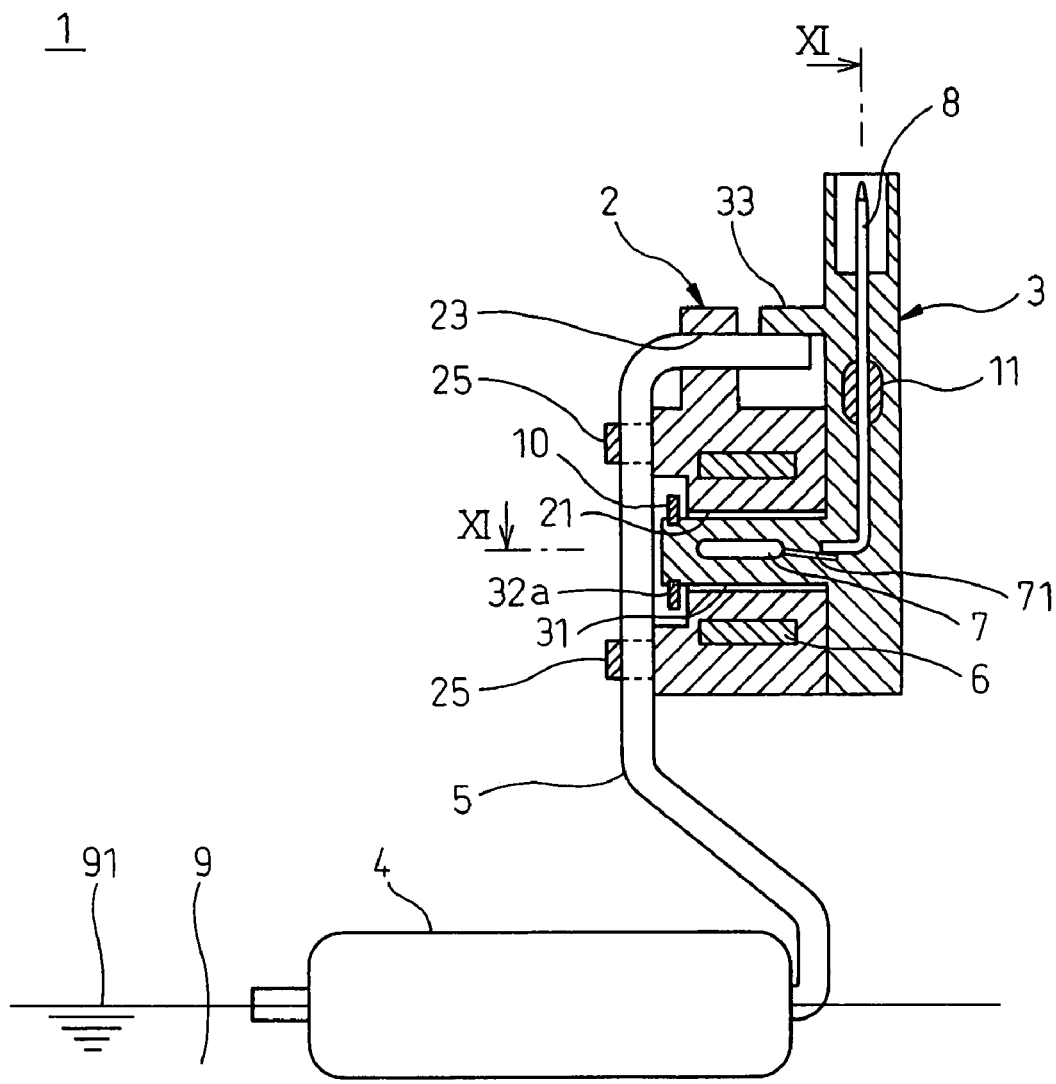
FIG. 10 is a sectional view of the fuel level gauge 1 of the fourth embodiment of the present invention taken on line X-X in FIG. 9.

FIG. 10 is a sectional view of the fuel level gauge 1 of the fourth embodiment of the present invention taken on line X-X in FIG. 9.

Figure 11:
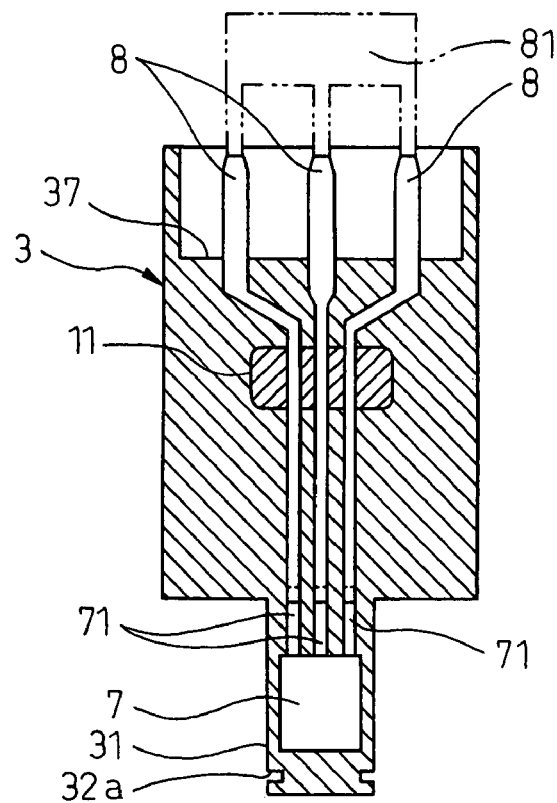
FIG. 11 is a partially sectional view of the fuel level gauge 1 of the fourth embodiment of the present invention taken on line XI-XI in FIG. 10.

FIG. 11 is a sectional view of the fuel level gauge 1 of the fourth embodiment of the present invention taken on line XI-XI in FIG. 10.

Figure 12:
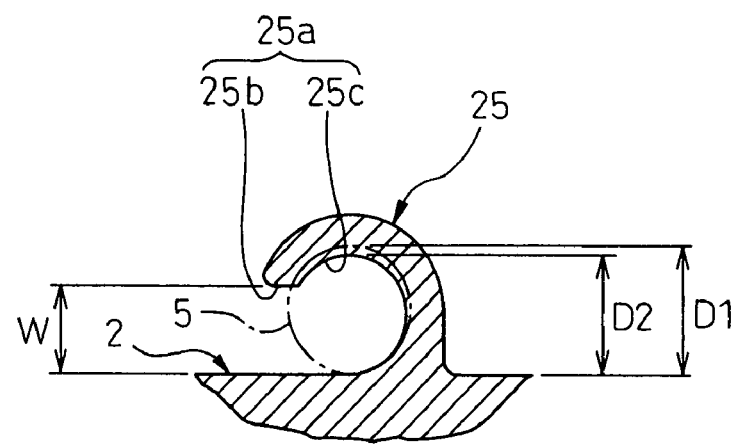
FIG. 12 is a partially sectional view of the fuel level gauge 1 of the fourth embodiment of the present invention taken on line XII-XII in FIG. 9.

FIG. 12 is a partially sectional view of the fuel level gauge 1 of the fourth embodiment of the present invention taken on line XII-XII in FIG. 9.

Figure 13:
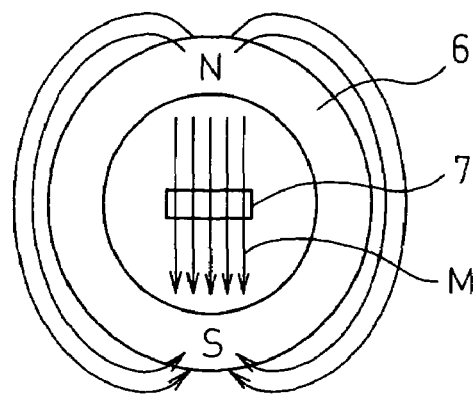
FIG. 13 is a view showing a model for explaining a distribution of the magnetic flux of the magnet 6 in the fuel level gauge 1 of the fourth embodiment of the present invention.

FIG. 13 is a view showing a model for explaining a distribution of the magnetic flux of the magnet 6 in the fuel level gauge 1 of the fourth embodiment of the present invention.

In this connection, in FIGS. 9 and 10, the upper part indicates an upper portion of the fuel level gauge 1 attached to an automobile.

FIGS. 9 and 10 show a state in which the liquid level 91 of fuel is the lowest, that is, FIGS. 9 and 10 show a state in which a fuel tank (not shown) is substantially empty.

In this connection, in FIG. 9, the liquid level 91, the float 4 and the arm 5 are shown by the broken lines in the state in which the liquid level 91 of fuel is the highest, that is, in the state in which the tank is filled with fuel. Accordingly, when the position of the liquid level 91 of fuel 9 is changed from the highest state to the lowest state and the float 4 is moved upward and downward according to the change in the position of the liquid level 91 of fuel 9, the magnet holder 2 is rotated by the angle θ. That is, the range of the rotary angle of the magnet holder 2 of the fuel level gauge 1 of the embodiment of the present invention is the angle θ.

The fuel level gauge 1 is fixed in a fuel tank (not shown) for storing the liquid fuel 9 and used for detecting the liquid level 91.

The float 4 is made of resin, the apparent specific gravity of which is determined so that the float 4 can positively float on the liquid surface 91 of fuel.

The arm 5 is composed of, for example, a metallic rod and connects the float 4 with the magnet holder 2. As shown in FIG. 9, one end portion of the arm 5 is fixed to the float 4, and the other end portion of the arm 5 is fixed to the magnet holder 2. When the float 4 is moved upward and downward according to the fluctuation of the liquid level 91, this movement of the float 4 is transmitted to the magnet holder 2 by the arm 5 and converted into a rotary motion of the magnet holder 2.

The magnet holder 2 is made of resin, and the magnet 6 is built in the magnet holder as shown in FIG. 10. This magnet holder 2 is pivotally engaged with the body 3 which is the main body portion described later. The magnet holder 2 is provided with a hole portion 21 which is pivotally engaged with the shaft portion 31 provided in the body 3 as shown in FIG. 11. The magnet holder 2 includes an engaging portion 25 and a through-hole 23 which are used for holding and fixing the arm 5. The structure of the engaging portion 25 is the same as that of the first to the third embodiment.

As shown in FIGS. 9 and 10, the through-hole 23 is formed in parallel with the hole portion 21 of the magnet holder 2. The diameter of the through-hole 23 is the same as the diameter D1 of the arm 5 or a little smaller than the diameter D1 of the arm 5. That is, the diameters of the through-hole 23 and the second fixing hole 24 and the diameter D1 of the arm 5 are determined as follows. When the arm 5 is attached to the magnet holder 2 in the step of assembling the fuel level gauge 1, the arm 5 can be easily inserted into the through-hole 23 by hand, and the interference fit can be accomplished so that the arm 5 can be rotated by hand after the arm 5 has been inserted into the through-hole 25. As shown in FIG. 9, the through-hole 23 is arranged so that the central axis of the through-hole 23 can cross the holding portion 25c of both engaging portions 25.

The magnet 6, which is built in the magnet holder 2, is composed of, for example, a ferrite magnet. In the fuel level gauge 1 of the embodiment of the present invention, a cylindrical type ferrite magnet is used. The magnet 6 is arranged concentrically with the hole portion 21. Further, as shown in FIG. 4, the magnet 6 is magnetized by two poles on the inner circumferential face. Accordingly, the magnetic flux of the magnet 6 flows in the radial direction of the hole portion 21. In the fuel level gauge 1 of the embodiment of the present invention, at the time of forming the magnet holder 2 by means of resin molding, the magnet 6 is integrally formed in the magnet holder 2 by means of injection molding.

The body 3, which is a main body portion, is made of, for example, resin. As shown in FIG. 10, the body includes a shaft portion 31, by which the magnet holder 2 is pivotally held. In the periphery of the forward end portion of the shaft portion 31, the ring-shaped groove 32a is provided concentrically with the shaft portion 31. After the hole portion 21 of the magnet holder 2 has been engaged with the shaft portion 31, the snap ring 10 is attached to this groove 32a. Due to the foregoing, the magnet holder 2 can be prevented from being separated from the body 3, that is, a movement of the magnet holder 2 to the left in FIG. 10 can be regulated. The body 3 includes a stopper 33 for regulating the rotary range of the magnet holder 2. In the fuel level gauge 1 of the embodiment of the present invention, as shown in the drawing, two stoppers 33 are provided so that the stoppers 33 can respectively cope with the highest level and the lowest level of the liquid surface. Each stopper 33 is formed integrally with the body 3 by means of molding and is provided in contact with a portion of the arm 5 protruding from the through-hole 23. In other words, in the case where the magnet holder 2 is assembled to the body 2 under the condition that the arm 5 is not attached to the magnet holder 2, the magnet holder 2 does not come into contact with the stopper 33. Therefore, the magnet holder 2 can be freely rotated. In this connection, the fuel level gauge 1 of the embodiment of the present invention is fixed to a fuel tank (not shown) via the body 3.

The body 3 includes: a Hall element 7 which is a magnetoelectric conversion element for detecting a rotary angle of the magnet holder 2; and a terminal 8 for electrically connecting the Hall element 7 with the outside.

The Hall element 7 which is a magnetoelectric conversion element is arranged in the shaft portion 31 as shown in FIG. 10. On the other hand, on the outer circumferential side of the shaft portion 31, the magnet 6 fixed to the magnet holder 2 is arranged concentrically with the shaft portion 31. Therefore, as shown in FIG. 13, the Hall element 7 crosses the magnetic flux M of the magnet 6 at all times. In this connection, operation of the Hall element 7 is the same as that of the first to the third embodiment.

The terminal 8 is made of a conductive metal. As shown in FIG. 10, one end portion of the terminal 8 is electrically connected to the lead 71 of the Hall element 7. This connection is accomplished, for example, by means of caulking or fusing. On the other hand, the other end portion of the terminal 8 protrudes outside from the end face 37 of the body 3 and connects with a connector (not shown) of a wire harness (not shown) provided. In the case of the fuel level gauge 1 of the embodiment of the present invention, the Hall element 7 has three leads 71 as shown in FIG. 11. Accordingly, three terminals 8 are provided corresponding to the three leads 71.

In the body 3, the seal rubber 11 is arranged between the end face 37 and the Hall element 7 so that the seal rubber 11 can be tightly contacted over the circumference of each terminal 8. The seal rubber 11 has a stable characteristic with respect to fuel, that is, even when the seal rubber 11 comes into contact with fuel, no corrosion or swelling are caused in the seal rubber 11. The seal rubber 11 is formed by means of molding. At the time of molding, three terminals are subjected to injection molding into the seal rubber 11 and integrated with the seal rubber 11. Therefore, the seal rubber 11 is baked to the overall circumferential surface of each terminal 8, and the seal rubber 11 and each terminal 8 are strongly and tightly attached to each other.

In the fuel level gauge 1 of the embodiment of the present invention, the Hall element 7 and the terminal 8 are integrated with each other by means of injection molding at the time of resin molding of the body 3.

Next, the method of assembling the fuel level gauge 1 of the embodiment of the present invention will be explained. Especially, the method of forming the seal rubber 11 and the method of attaching to the body 3, which are the characteristic of the fuel level gauge 1 of the embodiment of the present invention, will be mainly explained as follows.

By this time, three terminals 8 are integrally formed by means of press forming. That is, as shown in FIG. 11, three terminals 8 are connected with each other by the connecting portion 81 and formed into one piece of part. At this time, end portions of three terminals 8 on the Hall element 7 side are arranged at the same interval as the pitch of three leads 71 of the Hall element 7. The magnet 6 has been incorporated into the magnet holder 2 by means of injection molding. Further, the float 4 has been assembled to the arm 5.

First, of all, each lead 71 of the Hall element 7 is connected to each terminal 8 by means of fusing.

Next, the seal rubber 10 is formed by means of molding. At this time, the terminals 8, to which the Hall element 7 has already been connected in the step described before, are subjected to injection molding, so that the terminals 8 can be integrated with the seal rubber 11 into one body. Due to the foregoing, the seal rubber 11 is baked to the overall circumferential surface of each terminal 8, and the seal rubber 11 and each terminal 8 are strongly and tightly attached to each other.

In each step described above, three terminals 8 are connected with each other via the connecting portion 81 and formed into one piece of part. Therefore, the working property can be enhanced in the connecting step, in which the Hall element and each terminal 8 are connected, and in the injection molding step in which the seal rubber 11 is molded.

Next, the connecting portion 81 is cut off from each terminal 8. In this connection, since three terminals 8 are integrally connected to each other via the Hall element 7 and the seal rubber 11 at this point of time, the working property of handling the three terminals 8 is as excellent as that before the connecting portion 81 is cut off from each terminal 8.

Next, the body 3 is molded by means of resin molding. At this time, the seal rubber 11, which is formed integrally with the terminals 8 in the above step, is simultaneously subjected to injection molding. Due to the foregoing, the Hall element 7 is arranged at a predetermined position in the body 3, that is, in the shaft portion 31. Further, the side end portion of the connecting portion 81 of the terminal 8 is protruded from the end face 37 and capable of being connected to a connector (not shown) of a wire harness (not shown) provided outside.

In this case, at the time of molding the body 3, the seal rubber 11 is pushed from the outside by the injection pressure of resin and deformed by being compressed. Even after the body has been molded, the compressive state of the seal rubber 11 can be maintained. By the elastic force of the compressed seal rubber 11, surface pressure is generated between the seal rubber 11 and the body 3. As the temperature of resin is high at the time of molding the body 3, the seal rubber 11 and resin are strongly attached to each other.

Therefore, it is possible to provide an excellent sealing property between the seal rubber 11 and the terminal 8 and between the seal rubber 11 and the body 3.

Accordingly, even when a gap is formed between the terminal and the main body in the process of using the fuel level gauge 1 and the fuel 9 soaks into the gap, the seal rubber 11 can positively prevent the fuel 9 from getting to the Hall element 7.

Next, the magnet holder 2 is assembled to the body 3. That is, the shaft portion 31 of the body 3 is inserted into the hole portion 21 of the magnet holder 2 and the magnet holder 2 is made to come into contact with the body 3. Successively, the snap ring 10 is attached to the groove 32a of the shaft portion 31.

Next, in the above state, the magnet holder 2 and the body 3 are set in an adjusting device (not shown) to be exclusively used, and the magnet holder 2 is rotated and an output voltage of the Hall element 7 is confirmed and adjusted. In this case, for example, a pin (not shown) of the adjusting device is inserted into the through-hole 23 of the magnet holder 2 and then the magnet holder 2 is rotated and this pin is made to come into contact with the stopper 33 being protruded from the through-hole 23. Due to the foregoing, even when the arm 5 has not been attached, the same operation as that in the state in which the arm 5 has been attached can be conducted. Since this work is executed in the state in which the arm 5 has not been attached to the magnet holder 2, the adjusting work can be easily performed, and the adjusting device can be downsized.

Next, the arm 5 is attached to the magnet holder 2. At this time, first, the forward end portion of the arm 5 is engaged in the through-hole 23. Successively, while the arm 5 is being rotated around the through-hole 23, the arm 5 is pushed into the groove 25a of the engaging portion 25 so that the arm 5 can be completely engaged with the holding portion 25c.

In this way, the assembling work of the fuel level gauge 1 of the embodiment of the present invention is completed.

In the fuel level gauge 1 of the embodiment of the present invention explained above, the seal rubber 11 is arranged between the end face 37 and the Hall element 7 in the body 3 so that the seal rubber 11 can be tightly contacted with all the circumference of each terminal 8. In other words, three terminals 8 are integrated into one body by one piece of seal rubber 11, and the terminals 8 are subjected to injection molding to the seal rubber 11. Further, the Hall element 7, the seal rubber 11 and the terminal 8 are integrated into one body by means of injection molding in the body 3 at the time of resin molding.

Due to the foregoing, without increasing the number of parts and the time necessary for the assembling work by attaching a seal member such as an O-ring between each terminal and the main body in the case of the conventional liquid level detector, it is possible to provide a fuel level gauge 1 capable of preventing the fuel 9 from soaking into the periphery of the Hall element 7.

According to the method of manufacturing the fuel level gauge 1 of the embodiment of the present invention, it is possible to provide a method of manufacturing the fuel level gauge 1 capable of preventing the fuel 9 from soaking into the periphery of the Hall element 7 without increasing the number of parts and the time necessary for the assembling work.

Figure 14:
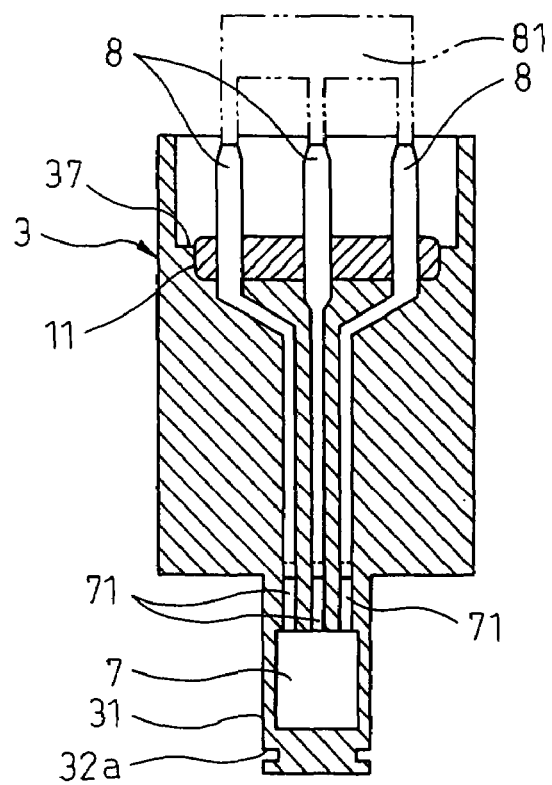
FIG. 14 is a partially sectional view showing the fuel level gauge 1 of the fourth embodiment of the present invention.

FIG. 14 is a sectional view showing a variation of the fuel level gauge 1 of the embodiment of the present invention. FIG. 14 corresponds to a sectional view taken on line XI-XI in FIG. 10.

In this variation, in the body 3, a portion of the seal rubber 11 is exposed outside the body 3 from the end face 37.

In this case, when the seal rubber 11 is pushed form the outside, for example, when a portion of a connector is pushed to the seal rubber 11 in the case of attaching the connector (not shown) of the external wiring to the body 3 so that the seal rubber 11 can be deformed being compressed, the contact pressure between the seal rubber 11 and the body 3 can be increased and the sealing property between them can be enhanced.

In the fuel level gauge 1 of the embodiment of the present invention, the number of the terminals 8 is three, that is, the number of the leads 71 of the Hall element 7 is three, however, it should be noted that the number is not limited to three and the number may be two or four or more.

According to the method of manufacturing the fuel level gauge 1 of the embodiment of the present invention explained above, the step of cutting off the connecting portion 81 from the terminals 8 is conducted after the terminal 8 has been subjected to injection molding at the time of molding the seal rubber 11 so that the terminal 8 is integrated into one body with the seal rubber 11 and before the terminal 8 is subjected to injection molding in the body 3. However, it should be noted that the order is not limited to the above specific embodiment. The step of cutting off the connecting portion 81 from the terminals 8 may be conducted after the terminals 8 integrated with the seal rubber 11 are subjected to injection molding at the time of molding the body 3 and integrated with the body 3.

According to the method of manufacturing the fuel level gauge 1 of the embodiment of the present invention explained above, the step in which the leads 71 of the Hall element 7 are connected to the terminals 8 is executed before the terminals 8 are subjected to injection molding at the time of molding the seal rubber 11 and integrated into one body with the seal rubber 11. However, this order may be reversed. That is, after the terminal 8 has been subjected to injection molding at the time of molding the seal rubber 11, the leads 71 of the Hall element 7 may be connected to the terminals 8.

Figure 15:
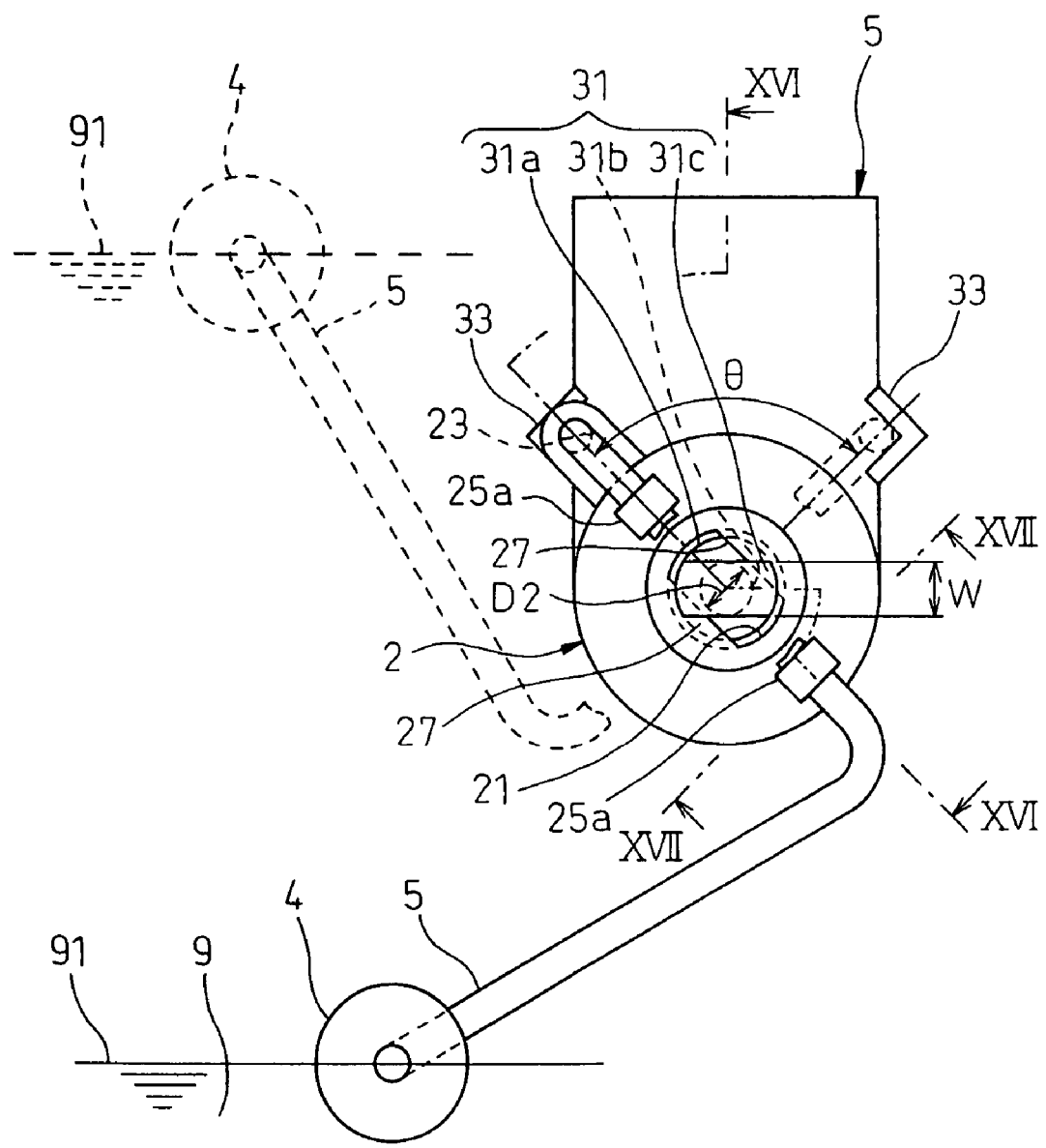

Next, the fifth embodiment will be explained below. FIG. 15 is a front view showing the fuel level gauge 1 of the fifth embodiment of the present invention, wherein FIG. 15 shows a state in which the liquid level 91 of fuel 9 is the lowest. In order to facilitate the understanding, a portion of the arm 5 is broken and omitted in FIG. 15.

Figure 16:
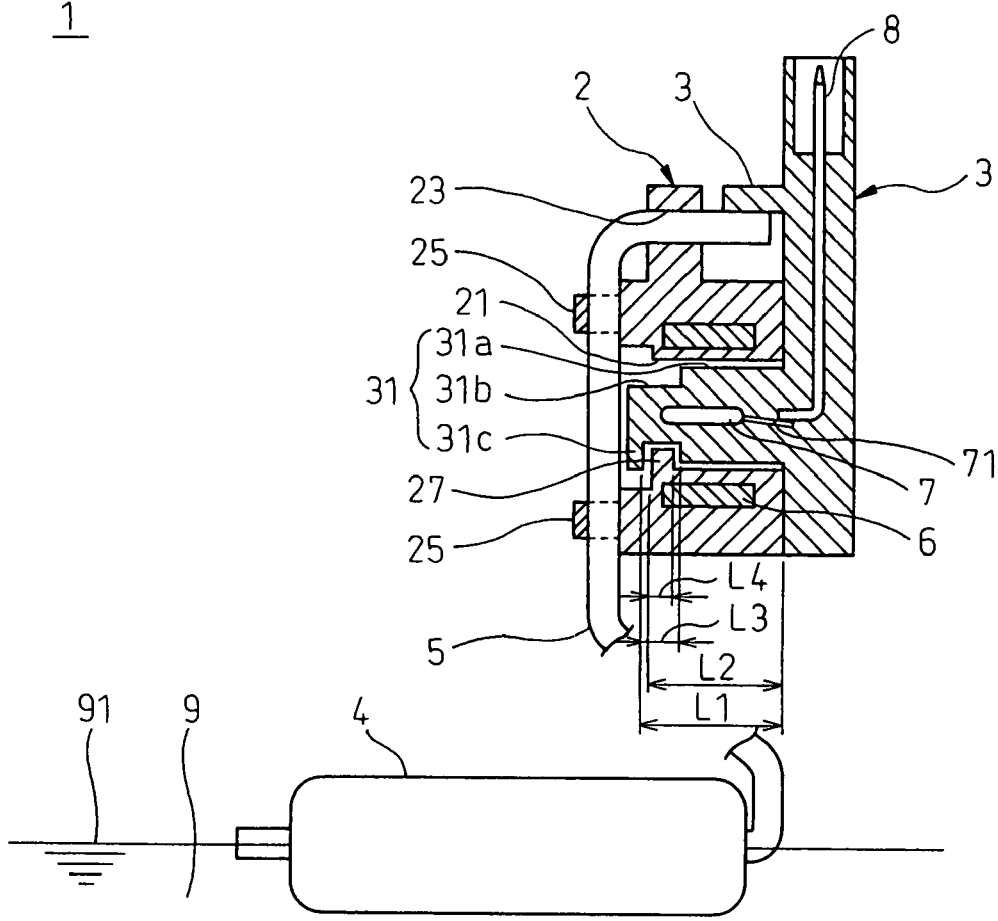
FIG. 16 is a partially sectional view of the fuel level gauge 1 of the fifth embodiment of the present invention taken on line XVI-XVI in FIG. 15.

FIG. 16 is a sectional view of the fuel level gauge 1 of the fifth embodiment of the present invention taken on line XVI-XVI in FIG. 15.

Figure 17:
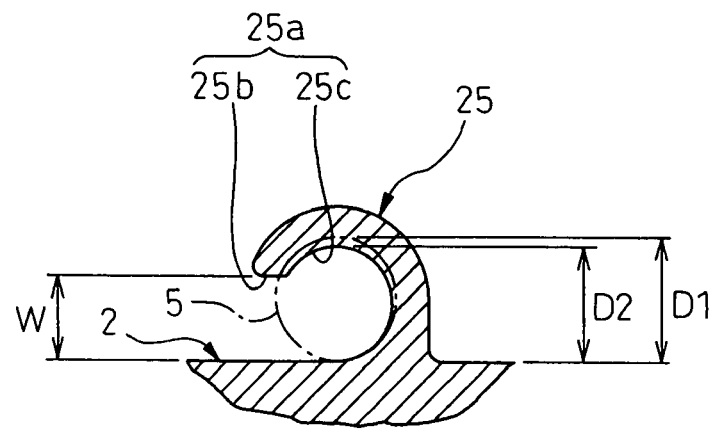
FIG. 17 is a partially sectional view of the fuel level gauge 1 of the fifth embodiment of the present invention taken on line XVII-XVII in FIG. 15.

FIG. 17 is a partially sectional view of the fuel level gauge 1 of the fifth embodiment of the present invention taken on line XVII-XVII in FIG. 15.

Figure 18:
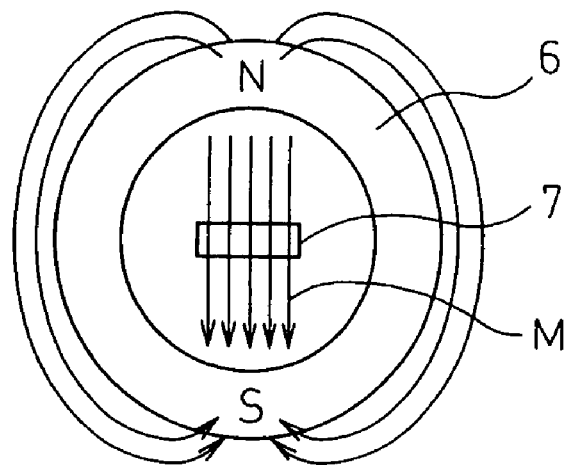
FIG. 18 is a view showing a model for explaining a distribution of the magnetic flux of the magnet 6 in the fuel level gauge 1 of the fifth embodiment of the present invention.

FIG. 18 is a view showing a model for explaining a distribution of the magnetic flux of the magnet 6 in the fuel level gauge 1 of the fifth embodiment of the present invention.

In this connection, in FIGS. 15 and 16, the upper part indicates an upper portion of the fuel level gauge 1 attached to an automobile.

In this connection, FIGS. 15 and 16 show a state in which the liquid level 91 of fuel is the lowest, that is, FIGS. 15 and 16 show a state in which the fuel tank (not shown) is substantially empty.

In FIG. 15, the highest state of the liquid level 91 of fuel is shown by the broken line, that is, the liquid level 91, the float 4 and the arm 5 at the time when the fuel tank is filled with fuel are shown by the broken line. Accordingly, when the liquid level 91 of fuel 9 is changed from the highest state to the lower state and the float 4 is moved upward and downward according to the change in the liquid level 91 of fuel 9 as shown in FIG. 15, the magnet holder 2 is rotated by the angle θ. That is, the rotary angle range of the magnet holder 2 of the fuel level gauge 1 of the embodiment of the present invention is the angle θ.

The float 4 is made of resin, and the apparent specific gravity of the float 4 is set at a value so that the float 4 can positively float on the liquid surface 91 of fuel.

The arm 5 is composed of, for example, a metallic rod and connects the float 4 with the magnet holder 2. As shown in FIG. 15, one end portion of the arm 5 is fixed to the float, and the other end portion of the arm 5 is fixed to the magnet holder 2. When the float 4 is moved upward and downward according to the fluctuation of the liquid level 91, this movement of the float 4 is transmitted to the magnet holder 2 by the arm 5 and converted into a rotary motion of the magnet holder 2.

The magnet holder 2 is made of resin, and the magnet 6 is built in the magnet holder 2 as shown in FIG. 16. This magnet holder 2 is pivotally engaged with the body 3 which is the main body portion described later. As shown in FIG. 16, the magnet holder 2 includes: a hole portion 21 to be pivotally engaged in the body 3; an engaging portion 25 for holding and fixing the arm 5; and a through-hole 23.

The structure of the magnet holder 2 will be explained below.

The magnet 6 is composed of, for example, a ferrite magnet. In the fuel level gauge 1 of the embodiment of the present invention, a cylindrical type ferrite magnet is used. The magnet 6 is arranged concentrically with the hole portion 21. Further, as shown in FIG. 18, the magnet 6 is magnetized to have two poles on the inner circumferential face. Accordingly, the magnetic flux M of the magnet 6 flows in the radial direction of the hole portion 21. In the fuel level gauge 1 of the embodiment of the present invention, at the time of forming the magnet holder 2 by means of resin molding, the magnet 6 is integrally formed in the magnet holder 2 by means of injection molding.

The structure of the engaging portion 25 is the same as that of the first to the fourth embodiment.

As shown in FIG. 16, the hole portion 21 is formed as a through-hole. When the hole portion 21 is engaged with the shaft portion 31 of the body 3, more particularly, when the hole portion 21 is pivotally engaged with the large diameter portion 31a, the magnet holder 2 can be rotated around the shaft portion 31 of the body 3. As shown in FIGS. 15 and 16, at the end portion of the inner wall of the hole portion 21 on the forward end side of the shaft portion 31, that is, at the left end portion in FIG. 16, the second protruding portions 27, the number of which is two, are formed in such a manner that the second protruding portions 27 extend in the radial direction of the hole portion 21. These two second protruding portions 27 are formed on the inner wall of the hole portion 21 at the interval of 180°, that is, these two second protruding portions 27 are formed being opposed to each other. The shape of the second protruding portion 27 is formed so that the first protruding portion 31c, which is provided at a forward end of the shaft portion 31 of the body 3 of the main body portion described later, can pass through, that is, the first protruding portion 31c can pass through in the axial direction in FIG. 16. In other words, the shape of the second protruding portion 27 is formed so that the first protruding portion 31c can pass in the opening portion of the hole 21 on the second protruding portion 27 side. When the second protruding portion 27 comes into contact with the first protruding portion 31c of the forward end portion of the shaft portion 31 of the body 3 in the axial direction, the magnet holder 2 is prevented from being separated from the body 3, that is, the movement of the magnet holder 2 to the left in FIG. 16 is regulated.

As shown in FIGS. 15 and 16, the through-hole 23 is formed in parallel with the hole portion 21 of the magnet holder 2. The diameter of the through-hole 23 is the same as the diameter D1 of the arm 5 or smaller than the diameter D1 of the arm 5. That is, the diameter of the through-hole 23 is determined as follows. When the arm 5 is attached to the magnet holder 2 in the step of assembling the fuel level gauge 1, the arm 5 can be easily inserted into the through-hole 23 by hand in such a manner that the interference fit can be accomplished so that the arm 5 can be rotated by hand after the arm 5 has been inserted into the through-hole 23. As shown in FIG. 15, the through-hole 23 is arranged so that the central axis of the through-hole 23 can cross the central axis of the holding portions 25c of both engaging portions 25.

The body 3, which is a main body portion, is made of, for example, resin. As shown in FIG. 16, the body 3 includes a shaft portion 31. The magnet holder 2 can be pivotally held by this shaft portion 31. The body 3 includes: a Hall element 7 which is a magnetoelectric conversion element for detecting a rotary angle of the magnet holder 2; and a terminal 8 for electrically connecting the Hall element 7 with the outside. The body 3 is provided with a stopper 33 for regulating a rotary range of the magnet holder 2. In this connection, the fuel level gauge 1 of the embodiment of the present invention is fixed to a fuel tank (not shown) via the body 3.

The structure of the body 3 will be explained as follows.

The shaft portion 31 is formed integrally with the body 3. As shown in FIG. 16, the shaft portion 31 includes: a large diameter portion 31a pivotally engaged with the hole portion 21 of the magnet holder 2; a small diameter portion 31b formed concentrically with the large diameter portion 31a at the forward end portion (the left end portion in FIG. 16) of the large diameter 31a; and a first protruding portion 31c provided at the forward end portion (the left end portion in FIG. 16) of the small diameter portion 31b in such a manner that the first protruding portion 31c extends in the radial direction of the small diameter portion 31b (in the vertical direction in FIG. 16).

As shown in FIG. 15, the first protruding portions 31c are formed on the outer circumference of the small diameter portion 31b at the interval of 180°, that is, the first protruding portions 31c are formed opposed to each other. The profile of the first protruding portion 31c in the axial direction (the direction perpendicular to the surface of FIG. 15) of the shaft portion 31 of the first protruding portion 31c is included in the profile of the shaft portion 31, that is, in the profile of the large diameter portion 31a. That is, the arcuate portion of the first protruding portion 31c is provided concentrically with the large diameter portion 31a and formed into an arc, the diameter of which is the same as that of the large diameter portion 31a or smaller than that of the large diameter portion 31a. Due to the above structure, in the case of engaging the magnet holder 2 with the body 3 when the fuel level gauge 1 is assembled, the first protruding portion 31c can pass through the hole portion 21 of the magnet holder 2.

As shown in FIG. 15, the width W of the first protruding portion 31c is formed into the same size as the diameter D3 of the small diameter portion 31b or formed into the size smaller than the diameter D3 of the small diameter portion 31b. As shown in FIG. 16, the length of the small diameter portion 31b is set to be sufficiently longer than the length L2 of the hole portion 21 of the magnet holder 2. As shown in FIG. 16, the length L3 is set to be a little larger than the thickness L4 of the second protruding portion 27 of the hole portion 21. That is, the length L3 and the length L4 are set so that the magnet holder 2 can be smoothly rotated and, further, a gap between the body 3 and the magnet holder 2 in the axial direction, that is, L3-L4 can be reduced to as small as possible. Due to the foregoing, the magnet holder 2 can be easily engaged with the body 3 at the time of assembling the fuel level gauge 1.

As shown in FIG. 16, the Hall element 7, which is a magnetoelectric conversion element, is arranged in the shaft portion 31. On the other hand, on the outer circumferential side of the shaft portion 31, the magnet 6 fixed to the magnet holder 2 is arranged concentrically with the shaft portion 31. Therefore, as shown in FIG. 18, the Hall element 7 crosses the magnetic flux M of the magnet 6 at all times. In this connection, operation of the Hall element 7 is the same as that of the first to the fourth embodiment.

In the fuel level gauge 1 of the fifth embodiment of the present invention, the two stoppers 33 for regulating a rotary range of the magnet holder 2 are respectively arranged at positions corresponding to the highest liquid level side and the lowest liquid level side as shown in FIG. 15. Each stopper 33 is formed integrally with the body 3 by means of molding. Each stopper 33 is provided at an end portion of the arm 5 on the opposite side to the float 2, that is, each stopper 33 is provided so that it can be contacted with a portion protruding from the through-hole 23 of the arm 5 as shown in FIG. 16. In other words, in the case where the magnet holder 2 is assembled to the body under the condition that the arm 5 is not attached to the magnet holder 2, the magnet holder 2 does not come into contact with the stopper 33, so that it can be freely rotated.

Next, a method of assembling the fuel level gauge 1 of the fifth embodiment of the present invention will be explained. Especially, the action and effect of the hole portion 21 of the magnet holder 2 and the shaft portion 31 of the body 3, which are the characteristic of the fuel level gauge 1 of the fifth embodiment of the present invention, will be mainly explained as follows.

By this time, the magnet holder 2 and the body 3 have already been assembled. Further, the arm 5 has been incorporated into the float 4.

First, the magnet holder 2 is assembled to the body 3. At this time, the shaft portion 31 of the body 3 is engaged in the hole portion 21 of the magnet holder 2, and the magnet holder 2 is inserted into the body 3 to the right in FIG. 16. The first protruding portion 31c of the shaft portion 31 is made to pass between the second protruding portions 27, which are opposed to each other, of the magnet holder 2 and protruded from the hole portion 21.

Next, the magnet holder 2 is rotated around the shaft portion 31, so that the phase of the second protruding portion 27 of the magnet holder 2 and the phase of the first protruding portion 31c of the body 3 can be shifted from each other. In other words, the positional relation is set so that the first protruding portion 31c cannot pass between the second protruding portions of the magnet holder 2 which are opposed to each other. Due to the foregoing, the second protruding portion 27 of the magnet holder 2 comes into contact with the first protruding portion 31c of the body 3, and the magnet holder 2 is prevented from being separated from the body 3, that is, the magnet holder 2 is prevented from being moved to the left in FIG. 16. That is, the magnet holder 2 can be prevented from coming out from the body 3.

In this case, in the fuel level gauge 1 of the fifth embodiment of the present invention, the phase of the second protruding portion 27 of the magnet holder 2 and the phase of the first protruding portion 31c of the body 3 are set so that the second protruding portion 27 can be surely contacted with the first protruding portion 31c and the movement of the magnet holder in the axial direction can be regulated when the magnet holder 2 is at least in the operational rotary range, that is, when the magnet holder 2 is in the range of the rotary angle θ shown in FIG. 15.

Due to the above structure, it becomes unnecessary to provide a flange, for preventing the magnet holder from coming out, which is provided in a conventional liquid level detector. That is, it becomes unnecessary to attach the flange for preventing the magnet holder from coming out. Accordingly, it is possible to realize a fuel level gauge 1 in which the number of parts can be reduced and, further, the time for assembling can be reduced.

Next, the thus assembled magnet holder and the body are set in an adjusting device (not shown) which is exclusively used, and the magnet holder 2 is rotated and an output voltage of the Hall element 7 is confirmed and adjusted. In this case, for example, a pin (not shown) of the adjusting device is inserted into the through-hole 23 of the magnet holder 2, and then the magnet holder 2 is rotated, and this pin is protruded from the through-hole 23 and contacted with the stopper 33. Due to the foregoing, even when the arm 5 has not been attached yet, the same operation as that of the case in which the arm 5 is attached can be conducted. This work is executed under the condition that the arm 5 has not been attached to the magnet holder 2. Therefore, the adjusting work can be easily performed, and the adjusting device can be downsized.

Next, the arm 5 is attached to the magnet holder 2. At this time, first, the forward end portion of the arm 5 is engaged in the through-hole 23. Successively, while the arm 5 is being rotated around the through-hole 23, the arm 5 is pushed into the groove 25a of the engaging portion 25 so that the arm 5 can be perfectly fitted to the holding portion 25c.

In this way, assembling of the fuel level gauge 1 of the fifth embodiment of the present invention is completed.

Figure 19:
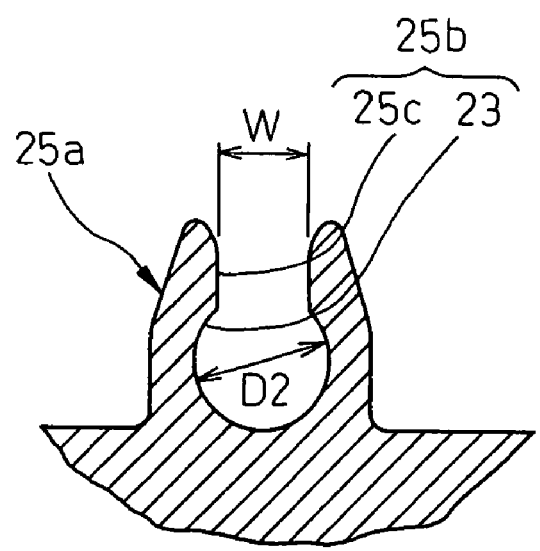
FIG. 19 is a partially sectional view showing a variation of the fuel level gauge 1 of the fifth embodiment of the present invention.
Figure 20:
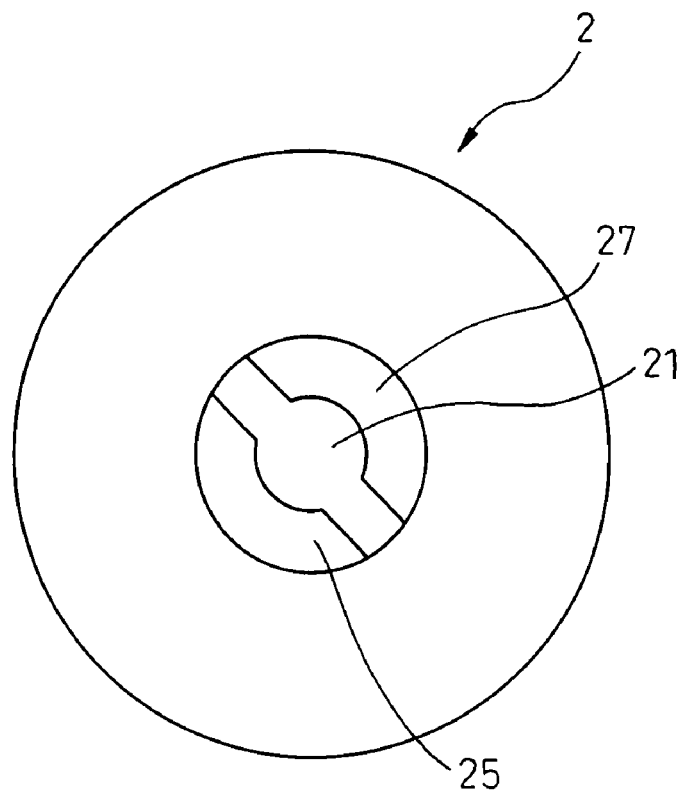
FIG. 20 is an exploded view showing the fuel level gauge 1 of the fifth embodiment of the present invention.
Figure 20:
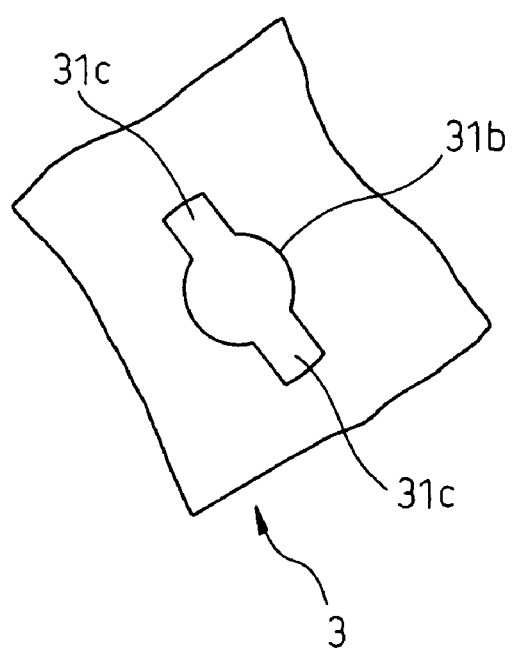

FIG. 19 is a partially sectional view showing a variation of the fuel level gauge 1 of the fifth embodiment of the present invention. FIG. 19 corresponds to a sectional view taken on line XVII-XVII in FIG. 15.

In this variation, the shape of the engaging portion 25 is changed as shown in FIG. 19. In this variation, when the arm 5 is attached to the magnet holder 2, the arm 5 is moved from top to bottom in FIG. 18 so as to insert the arm 5 into the holding portion 25c of the engaging portion 25.

In the fuel level gauge 1 of the fifth embodiment of the present invention, the second protruding portions 27 of the magnet holder 2, the number of which is two, are arranged being opposed to each other by the angle of 180°, and the first protruding portions 31c of the body 3, the number of which is two, are arranged being opposed to each other by the angle of 180°. However, the numbers of the second protruding portions 27 and the first protruding portions 31c and the positional relations of the second protruding portions 27 and the first protruding portions 31c are not necessarily limited to the above specific embodiment. As long as the movement of the magnet holder 2 in the axial direction can be regulated when the second protruding portion 27 is surely contacted with the first protruding portion 31c in the case where the magnet holder 52 is in the operational rotary range at the time of operation of the fuel level gauge 1, the number may be one or three or more, and the angular relation may be other than 180°.

In the fuel level gauges 1 according to the first to the fifth embodiment of the present invention explained above, the number of the engaging portions is two, however, the number of the engaging portions is not limited to two of the above specific embodiment. The number of the engaging portions may be one or three or more.

In the fuel level gauges 1 according to the first to the fifth embodiment of the present invention explained above, the magnet 6 is composed of a ferrite magnet made of ferrite. However, other materials may be used for the magnet 6, for example, the magnet 6 may be made of rare earth elements or bond.

In the fuel level gauges 1 according to the first to the fifth embodiment of the present invention explained above, the Hall element 7 is used for the magnetoelectric detection element. However, another magnetism detection element such as a magnetic resistance element or magnetic diode may be used.

In the first to the fifth embodiment of the present invention explained above, the liquid level detector is applied to the fuel level gauge 1 for automobile use. However, the use of the liquid level detector is not limited to the fuel level gauge 1 for automobile use. The liquid level detector may be applied to other liquid level detectors. Further, the liquid, the level of which is an object to be detected, is not limited to fuel. The liquid, the liquid level of which is detected, may be water, lubricant or various chemicals. In this case, the seal rubber 11 is made of material stable for the liquid to which the liquid level detector is applied, that is, the seal rubber 11 is made of material which is not corroded and swelled with respect to the liquid to which the liquid level detector is applied.

While the invention has been described by reference to specific embodiments chosen for purposes of illustration, it should be apparent that numerous modifications could be made thereto by those skilled in the art without departing from the basic concept and scope of the invention.

The invention claimed is:

1. A liquid level detector comprising:
    a rotary member; a fixing member for pivotally supporting the rotary member;
    a displacement member fixed to the rotary member, rotating integrally with the rotary member;
    a detection means for detecting a displacement of the displacement member, fixed to the fixing member;
    a float floating on the liquid;
    an arm, one end side of which is fixed to the float, the other end side of which is fixed to the rotary member, for converting a vertical motion of the float, which is caused by a vertical motion of a surface of the liquid, into a rotary motion of the rotary member;
    a stopper portion formed in the arm; and
    a pair of regulating means arranged in the fixing member, coming into contact with the stopper portion of the arm so as to regulate a rotary angle range of the rotary member, wherein
    the liquid level position is detected according to a position of the displacement member detected by the detection means,
    the fixing member is provided with a plurality of pairs of regulating means,
    a rotary angle range of the rotary member, which is set by the pair of regulating means, is different for each pair of regulating means, and the stopper portion provided in the arm is a linear portion, which is parallel with a rotary shaft of the rotary member, formed between the rotary member and the float.

2. A liquid level detector comprising:
- a rotary member having a rotational axis, wherein the rotary member is provided with a plurality of fixing holes arranged in a radial direction away from the rotational axis, each of the plurality of fixing holes extends in parallel with the rotational axis so that distances from the fixing holes to the rotational axis, as measured in a radial direction away from the rotational axis, differ from each other;
- a fixing member for pivotally supporting the rotary member;
- a displacement member fixed to the rotary member;
- a detection means for detecting a displacement of the displacement member, fixed to the fixing member;
- a float, which is adapted to float on the liquid;
- an arm, one end of which is fixed to the float, the other end of which is folded linearly in parallel with the rotational axis of the rotary member, wherein the folded portion constitutes a stopper portion, and the stopper portion of the arm is fitted within any one of the plurality of fixing holes to extend from the fixing hole; and
- a plurality of pairs of regulating means provided in the fixing member, wherein the regulating means come into contact with the stopper portion of the arm, which is fitted within any one of the plurality of fixing holes of the rotary member to extend from the fixing hole, to regulate a rotary angle range of the rotary member, wherein
- a rotary angle range of the rotary member, which is set by the pair of regulating means, is different for each pair of regulating means, and
- the liquid level position is detected according to a position of the displacement member detected by the detection means.

3. A liquid level detector according to claim 2, wherein the displacement member is a permanent magnet, and the detection means is a magnetic detection element.

4. A liquid level detector according to claim 2, wherein the displacement member is a sliding piece composed of an electrically conductive member, and the detection means is a resistance element in which the sliding piece is slidably arranged.

5. A liquid level detector according to claim 2 wherein the plurality of pairs of regulating means are arranged in a radial direction of the rotational axis and are located in the same plane.

6. A liquid level detector comprising:
- a rotary member having a rotational axis, wherein the rotary member is provided with a plurality of fixing holes arranged in a radial direction away from the rotational axis, each of the plurality of fixing holes extends in parallel with the rotational axis so that distances from the fixing holes to the rotational axis, as measured in a radial direction away from the rotational axis, differ from each other;
- a fixing member for pivotally supporting the rotary member;
- a displacement member fixed to the rotary member;
- a detector for detecting displacement of the displacement member, wherein the detector is fixed to the fixing member;
- a float, which is adapted to float on the liquid;
- an arm, one end of which is fixed to the float, the other end of which is folded linearly in parallel with the rotational axis of the rotary member, wherein the folded portion constitutes a stopper portion, and the stopper portion of the arm is fitted within any one of the plurality of fixing holes to extend from the fixing hole; and
- a plurality of pairs of stops provided in the fixing member, wherein the stops come into contact with the stopper portion of the arm, to regulate a rotary angle range of the rotary member, wherein
- a rotary angle range of the rotary member, which is determined by the stops, is different for each pair of stops, and
- the liquid level position is detected according to a position of the displacement member detected by the detector.

* * * * *